United States Patent
Ogane

(10) Patent No.: US 7,022,782 B2
(45) Date of Patent: Apr. 4, 2006

(54) HOMOGENEOUS TYPE SOLID CATALYST COMPONENT OR HOMOGENEOUS TYPE SOLID CATALYST, PROCESS FOR PRODUCTION THEREOF AND PROCESS FOR PRODUCING ADDITION POLYMER WITH THE SAME

(75) Inventor: Takuya Ogane, Sodegaura (JP)

(73) Assignee: Sumitomo Chemical Company, Limited, Osaka (JP)

(*) Notice: Subject to any disclaimer, the term of this patent is extended or adjusted under 35 U.S.C. 154(b) by 327 days.

(21) Appl. No.: 10/024,557

(22) Filed: Dec. 21, 2001

(65) Prior Publication Data

US 2002/0143124 A1    Oct. 3, 2002

(30) Foreign Application Priority Data

| Dec. 26, 2000 | (JP) | ............................. 2000-395776 |
| Jun. 27, 2001 | (JP) | ............................. 2001-194575 |
| Jun. 27, 2001 | (JP) | ............................. 2001-194576 |
| Sep. 27, 2001 | (JP) | ............................. 2001-297052 |

(51) Int. Cl.
*C08F 4/44* (2006.01)
*B01J 21/00* (2006.01)

(52) U.S. Cl. ...................... 526/160; 526/126; 526/130; 502/103; 502/129; 502/121; 502/123

(58) Field of Classification Search ................ 526/160, 526/126, 120; 502/103, 439
See application file for complete search history.

(56) References Cited

U.S. PATENT DOCUMENTS 6,054,406 A * 4/2000 Smith .......................... 502/107
6,344,528 B1 * 2/2002 Ushioda et al. ............. 526/114

* cited by examiner

*Primary Examiner*—David W. Wu
*Assistant Examiner*—Rip A. Lee
(74) *Attorney, Agent, or Firm*—Birch, Stewart, Kolasch & Birch, LLP

(57) ABSTRACT

A process for producing a homogeneous type solid catalyst component or a homogeneous type solid catalyst comprising a step for removing a fine-powdery component and/or a shapeless component utilizing a difference between their sedimentation velocities of the catalyst component or the catalyst in a solvent.

6 Claims, No Drawings

HOMOGENEOUS TYPE SOLID CATALYST COMPONENT OR HOMOGENEOUS TYPE SOLID CATALYST, PROCESS FOR PRODUCTION THEREOF AND PROCESS FOR PRODUCING ADDITION POLYMER WITH THE SAME

BACKGROUND OF THE INVENTION

1. Field of the Invention

The present invention relates to a process for producing a homogeneous type solid catalyst component or a homogeneous type solid catalyst, a homogeneous type solid catalyst component or a homogeneous type solid catalyst obtainable by said process, and a process for producing an addition polymer with the same.

2. Description of Related Arts

Addition polymers such as polypropylene, polyethylene and the like have been used in a wide variety of molding field because they are excellent in mechanical properties, chemical resistance and the like, and their production costs are relatively low.

Conventionally, these addition polymers have been produced by polymerizing an olefin or the like using a conventional type solid catalyst (multi-site catalyst) formed principally by combining a solid catalyst component obtained from a group IV metal compound such as titanium trichloride, titanium tetrachloride or the like with a group XIII metal compound represented by organic aluminum compounds.

In recent years, processes for producing addition polymers have been proposed in which an olefin compound or the like is polymerized by using a so-called single-site catalyst formed by combining a transition metal compound (for example, a metallocene complex or a non-metallocene complex) different from the conventionally used solid catalyst components with an aluminoxane. For example, JP-58-19309A discloses a process using bis(cyclopentadienyl)zirconium dichloride and methylaluminoxane. Also, a combination of such transition metal compound with a specific boron compound is reported. For example, JP-1-502036W discloses a process using bis(cyclopentadienyl)zirconium dimethyl and tri(n-butyl)ammonium tetrakis(pentafluorophenyl)borate. It has been known that more uniform addition polymers can be obtained in the case of single-site catalysts as compared with the case of conventional type solid catalysts due to the facts that addition polymers obtainable with these single-site catalysts generally have molecular weight distributions narrower than those of polymers obtainable with the conventional type solid catalysts (multi-site catalysts), and that, in the case of copolymers, comonomers are more uniformly copolymerized.

Since, however, these single-site catalysts are soluble in reaction systems, the produced addition polymer particles will have a shapeless form and there is a possibility of formation of coarse addition polymer particles, bulk addition polymers, fine-powdery addition polymers or the like, decrease in bulk density of the addition polymers, adhesion of the addition polymers to the wall of a polymerization reactor and the like, when they are applied in a polymerization accompanied by the formation of addition polymer particles (for example, slurry polymerization, vapor phase polymerization, bulk polymerization and the like). In addition, there have been problems that heat-transfer failure, heat-removing failure and the like may be caused resulting in a state in which a steady operation is difficult and in lowering of productivity, based on anyone as a cause.

Therefore, in order to apply the single-site catalysts in a polymerization accompanied by the formation of addition polymer particles (for example, slurry polymerization, vapor phase polymerization, bulk polymerization and the like), it is necessary not only to enable exhibition of sufficient polymerization activity but also to produce a polymer excellent in shape and particle properties. For solving the problems, processes in which a transition metal compound is carried on a carrier or others have been proposed.

In one approach, processes in which the whole or a part of a catalyst component such as a metallocene complex, methylaluminoxane and the like is immobilized or carried on an inorganic oxide carrier such as silica or the like have been described. For example, JP-A-60-35006, JP-A-60-35007 and JP-A-60-35008 disclose processes in which a soluble metallocene is deposited or adhered on a typical support, for example silica, alumina, polyethylene or the like, to form a homogeneous type solid catalyst component, which is combined with aluminoxane and used in the slurry polymerization or the vapor phase polymerization.

Also, JP-A-63-51407 and JP-A-63-89505 disclose processes in which olefin polymers are produced using homogeneous type solid catalyst component obtained by treating silica with methylaluminoxane and then with bis(cyclopentadienyl)zirconium dichloride.

Additionally, there has been described a process in which an olefin polymer is produced using a solid catalyst component obtained from a metallocene transition metal compound, a boron compound and a carrier or a homogeneous type solid catalyst component obtained from a metallocene transition metal compound, a boron compound, an organic aluminum compound and a carrier (JP-A-5-502906 and JP-A-6-336502).

In addition, recently, a report has been presented relating to a homogeneous type solid catalyst comprising a modified clay, as a substitute for the aluminoxane and the boron compound, formed by treating a clay mineral with a compound which can introduce a cation between its layers, a metallocene complex and an organic aluminum compound (JP-A-7-224106).

SUMMARY OF THE INVENTION

According to anyone of these processes, however, some fine-powdery component or shapeless component exists in the obtained homogeneous type solid catalyst component or homogeneous type solid catalyst. Addition polymer particles obtained with such product contains a much amount of fine-powdery polymer, shapeless polymer and agglomerates in which fine-powder and/or shapeless polymer are mutually adhered.

While processes containing sieving, spraying-method or air-separating-method have been known in order to remove fine-powdery component, these processes cannot be said as effective means, because, when these processes are applied to the production of a homogeneous type solid catalyst component or a homogeneous type solid catalyst, solid catalyst components or solid catalysts vigorously collide each other during these separation procedure whereby fresh fine-powdery component or fresh shapeless component is produced, newly.

Under these circumstances, an object of the present invention is to provide a homogeneous type solid catalyst component or a homogeneous type solid catalyst which can give an addition polymer excellent in shape and particle properties when applied as a single site catalyst to a polymerization accompanied by the formation of addition polymer particles (for example, slurry polymerization, vapor phase polymerization, bulk polymerization or the like) and a process for production thereof, as well as a process for producing an addition polymer in which a single site catalyst is applied to a polymerization accompanied by the formation of addition polymer particles (for example, slurry polymerization, vapor phase polymerization, bulk polymerization and the like) to produce an addition polymer excellent in shape and particle properties.

Namely, the present invention provides a process for producing a homogeneous type solid catalyst component or a homogeneous type solid catalyst comprising a step for removing a fine-powdery component and/or a shapeless component utilizing a difference between their sedimentation velocities in a solvent; a homogeneous type solid catalyst component or a homogeneous type solid catalyst obtainable by said process for production; and a process for producing an addition polymer using said homogeneous type solid catalyst component or said homogeneous type solid catalyst.

The invention is described below in more detail.

DETAILED DESCRIPTION OF THE INVENTION

The process for production according to the invention is a process in which a fine-powdery component and/or a shapeless component, formed during the production of a homogeneous type solid catalyst component or a homogeneous type solid catalyst, is removed utilizing a difference between their sedimentation velocities in a solvent. Particles meet with resistance by a solvent during sedimentation in the solvent. This resistance is greatly affected by the size and shape of the particles. In other words, the greater the particle size is, or the more spherical the particle shape is, or the smoother the particle surface is, the faster the sedimentation velocity is. In detail, these are described in, for example, "Kiichiro KUBO, Eiji MIZUTO, Yuzo NAKAGAWA and Sohachiro HAYAKAWA; Powder: Theory and Application (6th issue, 1977).

In the present invention, the fine-powdery component and the shapeless component are removed utilizing the resistance of the solvent. Because the fine-powdery component has a small particle diameter and the shapeless component has an irregular shape, the sedimentation velocities of them are slow. Therefore, the fine-powdery component and the shapeless component are suspended in the solvent even after a component with a large particle diameter and a component with a regular and spherical shape precipitated. In this condition, separation can effectively be performed by removing a slurry-form portion containing the fine-powdery component and the shapeless component.

The procedure for separation can be carried out at any step within steps for producing a homogeneous type solid catalyst component or a homogeneous type solid catalyst. Of coarse, it is also possible to separate by re-dispersing in a solvent after the process for production is over. Since, however, a drying step is generally inserted after the process for production, re-wetting with a solvent is disadvantageous in the production cost. Therefore, it is preferred to carry out a separation operation in the midway of production. It is more preferred to insert the separation operation in a washing step. When several washing steps are conducted, it is further preferred to carry out the separation operation in the final washing step. Consequently, more preferred process for production according to the invention is directed to a process for producing a homogeneous type solid catalyst component or a homogeneous type solid catalyst comprising, in a washing step (further preferably in the final washing step) in the production of a homogeneous type solid catalyst component or a homogeneous type solid catalyst, a step for removing a fine-powdery component and/or a shapeless component by removing a slurry-form portion before the completion of sedimentation of a fine-powdery component and/or a shapeless component.

For the solvent used in the separation, any solvent can be used including both of non-polar solvents such as aliphatic hydrocarbon solvents, aromatic hydrocarbon solvents and the like, and polar solvents such as halide solvents, ether solvents, alcohol solvents, phenol solvents, carbonyl solvents, phosphoric acid derivatives, nitrile solvents, nitro compounds, amine solvents, sulfur compounds and the like, insofar as it is inactive to a homogeneous type solid catalyst component or a homogeneous type solid catalyst. Among these solvents, preferred solvents have a density smaller than the true density of a homogeneous type solid catalyst component or a homogeneous type solid catalyst to be treated. A mixture of plural solvents can also be used.

A period from discontinuance of stirring in the state in which a homogeneous type solid catalyst component or a homogeneous type solid catalyst is suspended in the above solvent by stirring to commencement of the removal of slurry-form portion in which a fine-powdery component or a shapeless component is suspended may optionally be determined and it is preferred to commence the removal at a point in time at which an interface between a layer of precipitated solid component and an upper layer of layer of slurry-form portion becomes visible. In this occasion, sometimes a spherical component with a large particle diameter is simultaneously removed but its amount is small and usually less problematic. Repeating number of separation procedure has no limitation and can optionally be selected. Effective separation can be performed with increasing repetition numbers, with plural number being preferred and thrice or more being more preferred. The temperature for separation can optionally be determined. A higher temperature is preferred because sometimes an shapeless component dissolves.

The removal procedure of a slurry-form portion may be performed by any method in which the slurry-form portion can be removed. Movement of a container is not desirable because the precipitated component may be whirled in the solvent. A preferred method is to remove by sucking through a hollow tube hanged from upside of the container. When the tube is hanged, it is preferred to drop the end near the upper layer of the precipitated and deposited component. The hollow tube used here does not have a filter for filtration.

When the procedure is performed in a metal container, sedimentation cannot be visually observed. Therefore, it is difficult to hang a tube near the upper surface of the precipitated and deposited component by visual observation. It is preferred to pre-determine a sedimentation velocity and sedimentation volume of a component to be separated. By doing so, a sedimentation time and length of the tube can be determined based on the relation between the sedimentation velocity and sedimentation length, and effective separation procedure can be performed without a visual observation.

The homogeneous type solid catalyst component produced by the process for production according to the invention means a solid catalyst component capable of forming a single site catalyst, and the homogeneous type solid catalyst means a solid single site catalyst. The single site catalyst referred to herein is directed to a concept distinguished from the conventional type solid catalyst and includes not only single site catalysts in a narrow sense which give an addition polymer having a narrow molecular weight distribution and having a narrow component distribution in the case of copolymerization but also catalysts which give an addition polymer having a broad molecular weight distribution or an addition polymer having a broad component distribution in the case of copolymerization, as far as the catalysts can be obtained by a process for preparation similar to that for the single site catalysts in narrow sense.

The homogeneous type solid catalyst component or homogeneous type solid catalyst produced by the process for production according to the invention includes various type products described above with respect to prior arts, and preferably applied to the production of modified particles of the following (I), the following (II) or the following (III), and further preferably applied to the production of modified particles of the following (I):

(I) Modified particle obtainable by contacting the following (a), the following (b), the following (c) and particle (d):
(a): a compound represented by the following general formula [1]:

$$M^1L^1_m \quad [1]$$

(b): a compound represented by the following general formula [2]:

$$R^1_{t-1}TH \quad [2]$$

(c): a compound represented by the following general formula [3]:

$$R^2_{t-2}TH_2 \quad [2]$$

(in the above formulae [1] to [3], respectively, $M^1$ represents a typical metal atom in the groups I, II, XII, XIV or XV in The Periodic Table, and m represents a valence of $M^1$; $L^1$ represents a hydrogen atom, a halogen atom or a hydrocarbon group, and in case where plural $L^1$s exist, they may be the same or different; $R^1$ represents an electron attractive group or a group containing an electron attractive group, and in case where plural $R^1$s exist, they may be the same or different; $R^2$ represents a hydrocarbon group or a halogenated hydrocarbon group; T represents, independent of each other, an atom in the groups XV or XVI in The Periodic Table, and t represents a valence of T in respective compounds.), (II) modified particle obtainable by contacting an aluminoxane (f) and particle (d), and (III) modified particle obtainable by contacting an aluminoxane (f) particle (d) and a transition metal component (g).

These are described below.

(I) Modified Particle Obtainable by Contacting the Above-described (a), (b), (c) and (d)

$M^1$ in the general formula [1] represents a typical metal atom of the Group I, II, XII, XIV or XV of the Periodic Table of the Elements (Revised edition of IUPAC Inorganic Chemistry Nomenclature 1989). Specific examples thereof include a lithium atom, sodium atom, potassium atom, rubidium atom, cesium atom, beryllium atom, magnesium atom, calcium atom, strontium atom, barium atom, zinc atom, cadmium atom, mercury atom, germanium atom, tin atom, lead atom, antimony atom, bismuth atom and the like. As $M^1$, an atom of the Group XII is preferable in particular, and a zinc atom is most preferable.

m in the general formula [1] above represents a valence of $M^1$ and, for example, when $M^1$ is a zinc atom, m is 2.

$L^1$ in the general formula [1] represents a hydrogen atom, a halogen atom or a hydrocarbon group, and when a plural number of $L^1$'s exist, they may be mutually the same or different. Specific examples of the halogen atom in $L^1$ include a fluorine atom, a chlorine atom, a bromine atom, and an iodine atom. As a hydrocarbon group in $L^1$, an alkyl group, an aryl group or an aralkyl group is preferable.

As the alkyl group, an alkyl group having 1 to 20 carbon atoms is preferable. Examples include thereof a methyl group, an ethyl group, a n-propyl group, an isopropyl group, a n-butyl group, a sec-butyl group, a tert-butyl group, an isobutyl group, a n-pentyl group, a neopentyl group, a n-hexyl group, a n-octyl group, a n-decyl group, a n-dodecyl group, a n-pentadecyl group, a n-eicosyl group, and the like. A methyl group, an ethyl group, an isopropyl group, a tert-butyl group or an isobutyl group is more preferable.

Any one of these alkyl groups may be substituted with a halogen atom such as a fluorine atom, a chlorine atom, a bromine atom, or an iodine atom. Examples of the alkyl group having 1 to 20 carbon atoms which is substituted with the halogen atom include a fluoromethyl group, a difluoromethyl group, a trifluoromethyl group, a chloromethyl group, a dichloromethyl group, a trichloromethyl group, a bromomethyl group, a dibromomethyl group, a tribromomethyl group, an iodomethyl group, a diiodomethyl group, a triiodomethyl group, a fluoroethyl group, a difluoroethyl group, a trifluoroethyl group, a tetrafluoroethyl group, a pentafluoroethyl group, a chloroethyl group, a dichloroethyl group, a trichloroethyl group, a tetrachloroethyl group, a pentachloroethyl group, a bromoethyl group, a dibromoethyl group, a tribromoethyl group, a tetrabromoethyl group, a pentabromoethyl group, a perfluoropropyl group, a perfluorobutyl group, a perfluoropentyl group, a perfluorohexyl group, a perfluorooctyl group, a perfluorododecyl group, a perfluoropentadecyl group, a perfluoroeicosyl group, a perchloropropyl group, a perchlorobutyl group, a perchloropentyl group, a perchlorohexyl group, a perchlorooctyl group, a perchlorododecyl group, a perchloropentadecyl group, a perchloroeicosyl group, a perbromopropyl group, a perbromobutyl group, a perbromopentyl group, a perbromohexyl group, a perbromooctyl group, a perbromododecyl group, a perbromopentadecyl group, a perbromoeicosyl group and the like.

Further, these alkyl groups may be partially substituted with an alkoxy group such as a methoxy group, an ethoxy group or the like, an aryloxy group such as a phenoxy group or the like, or an aralkyloxy group such as a benzyloxy group or the like, etc.

As the aryl group, an aryl group having 6 to 20 carbon atoms is preferable. Examples thereof include a phenyl group, a 2-tolyl group, a 3-tolyl group, a 4-tolyl group, a 2,3-xylyl group, a 2,4-xylyl group, a 2,5-xylyl group, a 2,6-xylyl group, a 3,4-xylyl group, a 3,5-xylyl group, a 2,3,4-trimethylphenyl group, a 2,3,5-trimethylphenyl group, a 2,3,6-trimethylphenyl group, a 2,4,6-trimethylphenyl group, a 3,4,5-trimethylphenyl group, a 2,3,4,5-tetramethylphenyl group, a 2,3,4,6-tetramethylphenyl group, a 2,3,5,6-tetramethylphenyl group, a pentamethylphenyl group, an ethylphenyl group, a n-propylphenyl group, an isopropylphenyl group, a n-butylphenyl group, a sec-butylphenyl group, a tert-butylphenyl group, a n-pentylphenyl group, a neopentylphenyl group, a n-hexylphenyl group, a n-octylphenyl group, a n-decylphenyl group, a n-dodecylphenyl group, a n-tetradecylphenyl group, a naphthyl group, an anthracenyl group and the like, and a phenyl group is more preferable.

These aryl groups may be partially substituted with a halogen atom such as a fluorine atom, a chlorine atom, a bromine atom or an iodine atom, an alkoxy group such as a methoxy group, an ethoxy group or the like, an aryloxy group such as a phenoxy group or the like, or an aralkyloxy group such as a benzyloxy group or the like, etc.

As the aralkyl group, an aralkyl group having 7 to 20 carbon atoms is preferable. Examples thereof include a benzyl group, a (2-methylphenyl)methyl group, a (3-methylphenyl)methyl group, a (4-methylphenyl)methyl group, a (2,3-dimethylphenyl)methyl group, a (2,4-dimethylphenyl)methyl group, a (2,5-dimethylphenyl)methyl group, a (2,6-dimethylphenyl)methyl group, a (3,4-dimethylphenyl)methyl group, (3,5-dimethylphenyl)methyl group, a (2,3,4-timethylphenyl)methyl group, a (2,3,5-timethylphenyl)methyl group, a (2,3,6-timethylphenyl)methyl group, a (3,4,5-timethylphenyl)methyl group, a (2,4,6-timethylphenyl)methyl group, a (2,3,4,5-tetramethylphenyl)methyl group, a (2,3,4,6-tetramethylphenyl)methyl group, a (2,3,5,6-tetramethylphenyl)methyl group, a (pentamethylphenyl)methyl group, an (ethylphenyl)methyl group, a (n-propylphenyl)methyl group, an (isopropylphenyl)methyl group, a (n-butylphenyl)methyl group, a (sec-butylphenyl)methyl group, a (tert-butylphenyl)methyl group, a (n-pentylphenyl)methyl group, a (neopentylphenyl)methyl group, a (n-hexylphenyl)methyl group, a (n-octylphenyl)methyl group, a (n-decylphenyl)methyl group, a (n-dodecylphenyl methyl group, a (n-tetradecylphenyl)methyl group, a naphthylmethyl group, an anthracenylmethyl group and the like, and a benzyl group is more preferable.

These aralkyl groups may be partially substituted with a halogen atom such as a fluorine atom, a chlorine atom, a bromine atom, an iodine atom or the like, an alkoxy group such as a methoxy group, an ethoxy group or the like, an aryloxy group such as a phenoxy group or the like, or an aralkyloxy group such as a benzyloxy group or the like, etc.

The above-mentioned $L^1$ is preferably a hydrogen atom, an alkyl group or an aryl group, more preferably a hydrogen atom or an alkyl group, and preferably an alkyl group in particular.

Respective T in the above-mentioned general formulae [2] and [3] independently represent an atom of the Group XV or Group XVI of the Periodic Table of the Elements (Revised edition of IUPAC Inorganic Chemistry Nomenclature 1989). T in the general formula [2] and T in the general formula [3] may be the same or different. Specific examples of the atom of the Group XV include a nitrogen atom, a phosphorus atom, and the like, and specific examples of the atom of the Group XVI include an oxygen atom, a sulfur atom, and the like. Respective T is preferably independently a nitrogen atom, or an oxygen atom, and more preferably an oxygen atom.

Respective t in the above-mentioned general formulae [2] and [3] represents a valence of T, respectively, and for example, when T is an atom of the Group XV, t is 3 and when T is an atom of the Group XVI, t is 2.

Respective $R^1$ in the above-mentioned general formula [2] represents an electron-withdrawing group or a group containing an electron-withdrawing group, and when a plural number of $R^1$'s exist, they may be mutually the same or different. As an index of the electron-withdrawing property, the substituent constant σ of the Hammet's rule and the like are known, and a functional group in which the substituent constant σ of the Hammet's rule is positive can be mentioned as an electron-withdrawing group.

Specific examples of the electron-withdrawing group include a fluorine atom, a chlorine atom, a bromine atom, an iodine atom, a cyano group, a nitro group, a carbonyl group, a sulfone group, a phenyl group and the like.

The group containing an electron-withdrawing group preferably include a halogenated alkyl group, halogenated aryl, and a (halogenated alkyl)aryl group, cyanated aryl group and nitrated aryl group), an ester group (an alkoxycarbonyl group, aralkyloxycarbonyl group, aryloxycarbonyl group), acyl group and the like.

Specific examples of the halogenated alkyl group include a fluoromethyl group, a chloromethyl group, a bromomethyl group, an iodomethyl group, a difluoromethyl group, a dichloromethyl group, a dibromomethyl group, a diiodomethyl group, a trifluoromethyl group, a trichloromethyl group, a tribromomethyl group, a triiodomethyl group, a 2,2,2-trifluoroethyl group, a 2,2,2-trichloroethyl group, a 2,2,2-tribromoethyl group, a 2,2,2-triiodoethyl group, a 2,2,3,3,3-pentafluoropropyl group, a 2,2,3,3,3-pentachloropropyl group, a 2,2,3,3,3-pentabromopropyl group, a 2,2,3,3,3-pentaiodopropyl group, a 2,2,2-trifluoro-1-trifluoromethylethyl group, a 2,2,2-trichloro-1-trichloromethylethyl group, a 2,2,2-tribromo-1-tribromomethylethyl group, a 2,2,2-triiodo-1-triiodomethylethyl group, a 1,1-bis(trifluoromethyl)-2,2,2-trifluoroethyl group, a 1,1-bis(trichloromethyl)-2,2,2-trichloroethyl group, a 1,1-bis(tribromomethyl)-2,2,2-tribromoethyl group, a 1,1-bis(triiodomethyl)-2,2,2-triiodoethyl group, and the like.

Specific examples of the halogenated aryl group include a 2-fluorophenyl group, a 3-fluorophenyl group, a 4-fluorophenyl group, a 2,4-difluorophenyl group, a 2,6-difluorophenyl group, a 3,4-difluorophenyl group, a 3,5-difluorophenyl group, a 2,4,6-trifluorophenyl group, a 3,4,5-trifluorophenyl group, 2,3,5,6-tetrafluorophenyl group, pentafluorophenyl group, 2,3,5,6-tetrafluoro-4-trifluoromethylphenyl group, 2,3,5,6-tetrafluoro-4-pentafluorophenylphenyl group, perfluoro-1-naphtyl group, perfluoro-2-naphtyl group, a 2-chlorophenyl group, a 3-chlorophenyl group, a 4-chlorophenyl group, a 2,4-dichlorophenyl group, a 2,6-dichlorophenyl group, a 3,4-dichlorophenyl group, a 3,5-dichlorophenyl group, a 2,4,6-trichlorophenyl group, a 3,4,5-trichlorophenyl group, 2,3,5,6-tetrachlorophenyl group, pentachlorophenyl group, 2,3,5,6-tetrachloro-4-trichloromethylphenyl group, 2,3,5,6-tetrachloro-4-pentachlorophenylphenyl group, perchloro-1-naphtyl group, perchloro-2-naphtyl group, a 2-bromophenyl group, a 3-bromophenyl group, a 4-bromophenyl group, a 2,4-dibromophenyl group, a 2,6-dibromophenyl group, a 3,4-dibromophenyl group, a 3,5-dibromophenyl group, a 2,4,6-tribromophenyl group, a 3,4,5-tribromophenyl group, 2,3,5,6-tetrabromophenyl group, pentabromophenyl group, 2,3,5,6-tetrabromo-4-tribromomethylphenyl group, 2,3,5,6-tetrabromo-4-pentabromophenylphenyl group, perbromo-1-naphtyl group, perbromo-2-naphtyl group, a 2-iodophenyl group, a 3-iodophenyl group, a 4-iodophenyl group, a 2,4-diiodophenyl group, a 2,6-diiodophenyl group, a 3,4-diiodophenyl group, a 3,5-diiodophenyl group, a 2,4,6-triiodophenyl group, a 3,4,5-triiodophenyl group, 2,3,5,6-tetraiodophenyl group, pentaiodophenyl group, 2,3,5,6-tetraiodo-4-triiodomethylphenyl group, 2,3,5,6-tetraiodo-4-pentaiodophenylphenyl group, periodo-1-naphtyl group, periodo-2-naphtyl group and the like.

Specific examples of the (halogenated alkyl)aryl group include a 2-(trifluoromethyl)phenyl group, a 3-(trifluoromethyl)phenyl group, a 4-(trifluoromethyl)phenyl group, a 2,6-bis(trifluoromethyl)phenyl group, a 3,5-bis(trifluoromethyl)phenyl group, a 2,4,6-tris(trifluoromethyl)phenyl group, 3,4,5-tris(trifluoromethyl)phenyl group, and the like.

Specific examples of the cyanated aryl group include a 2-cyanophenyl group, a 3-cyanophenyl group, a 4-cyanophenyl group and the like.

Specific examples of the nitrated aryl group include a 2-nitrophenyl group, a 3-nitrophenyl group, a 4-nitrophenyl group and the like Specific examples of the ester group include a methoxycarbonyl group, an ethoxycarbonyl group, a n-propoxycarbonyl group, an isopropoxycarbonyl group, a phenoxycarbonyl group, a trifluoromethoxycarbonyl group, a pentafluorophenoxycarbonyl group, and the like.

Specific examples of the acyl group include a formyl group, an ethanoyl group, a propanoyl group, a buthanoyl group, a trifluoroethanoyl group, a benzoyl group, a pentafluorobenzoyl group, and the like.

$R^1$ is preferably a halogenated hydrocarbon group, and more preferably the halogenated alkyl group or halogenated aryl group. Further preferable is a fluoromethyl group, a difluoromethyl group, a trifluoromethyl group, a 2,2,2-trifluoroethyl group, a 2,2,3,3,3-pentafluoropropyl group, a 2,2,2-trifluoro-1-trifluoromethylethyl group, a 1,1-bis(trifluoromethyl)-2,2,2-trifluoroethyl group, a 2-fluorophenyl group, a 3-fluorophenyl group, a 4-fluorophenyl group, a 2,4-difluorophenyl group, a 2,6-difluorophenyl group, a 3,4-difluorophenyl group, a 3,5-difluorophenyl group, a 3,4,5-trifluorophenyl group, a 2,4,6-trifluorophenyl group, a 2,3,5,6-tetrafluorophenyl group, a pentafluorophenyl group, a 2,3,5,6-tetrafluoro-4-trifluorophenyl group, a 2,3,5,6-tetrafluoro-4-pentafluorophenyl group, perfluoro-1-naphtyl group, perfluoro-2-naphtyl group, a chloromethyl group, a dichloromethyl group, a trichloromethyl group, a 2,2,2-trichloroethyl group, a 2,2,3,3,3-pentachloropropyl group, a 2,2,2-trichloro-1-trichloromethylethyl group, a 1,1-bis(trichloromethyl)-2,2,2-trichloroethyl group, a 4-chlorophenyl group, a 2,6-dichlorophenyl group, a 3,5-dichlorophenyl group, a 2,4,6-trichlorophenyl group, a 3,4,5-trichlorophenyl group or a pentachlorophenyl group. A fluoroalkyl group or a fluoroaryl group is preferable in particular, and a trifluoromethyl group, a 2,2,2-trifluoro-1-trifluoromethylethyl group, a 1,1-bis(trifluoromethyl)-2,2,2-trifluoroethyl group, a 3,5-difluorophenyl group, a 3,4,5-trifluorophenyl group, or a pentafluorophenyl group is most preferable.

$R^2$ represents in the general formula [3] represents a hydrocarbon group or a halogenated hydrocarbon group. The hydrocarbon group in $R^2$ is preferably an alkyl group, aryl group or aralkyl group, and the same hydrocarbon group as illustrated in the general formula [1] as $L^1$ is used. The halogenated hydrocarbon group in $R^2$ includes a halogenated alkyl group, halogenated aryl group, or (halogenated alkyl)aryl group, and the like, and the same halogenated alkyl group, halogenated aryl group, and (halogenated alkyl) aryl group as mentioned as specific examples of the electron-withdrawing group in $R^1$ of the general formula [2] are used.

$R^2$ in the general formula [3] is preferably a halogenated hydrocarbon group, and further preferably a fluorinated hydrocarbon group Specific examples of the compound (a) in the case in which $M^1$ is a zinc atom, include dialkylzincs such as dimethylzinc, diethylzinc, dipropylzinc, di-n-butylzinc, di-isobutylzinc, di-n-hexylzinc and the like: diarylzincs such as diphenylzinc, dinaphthylzinc, bis(pentafluorophenyl)zinc and the like; dialylzincs such as diarknylzinc and the like; dialkylzinc halides such as methylzinc chloride, ethylzinc chloride, propylzinc chloride, n-butylzinc chloride, isobutylzinc chloride, n-hexylzinc chloride, methylzinc bromide, ethylzinc bromide, propylzinc bromide, n-butylzinc bromide, isobutylzinc bromide, n-hexylzinc bromide, methylzinc iodide, ethylzinc iodide, propylzinc iodide, n-butylzinc iodide, isobutylzinc iodide, n-hexylzinc iodide and the like; zinc halides such as zinc fluoride, zinc chloride, zinc bromide and zinc iodide; and the like.

The compound (a) are preferably dialkylzincs, further preferably dimethylzinc, diethylzinc, dipropylzinc, di-n-butylzinc, di-isobutylzinc, di-n-hexylzinc, and in particular, dimethylzinc or diethylzinc is preferable.

Specific examples of the compound (b) include amines such as di(fluoromethyl)amine, di(chloromethyl)amine, di(bromomethyl)amine, di(iodomethyl)amine, bis(difluoromethyl)amine, bis(dichloromethyl)amine, bis(dibromomethyl)amine, bis(diiodomethyl)amine, bis(trifluoromethyl)amine, bis(trichloromethyl)amine, bis(tribromomethyl)amine, bis(triiodomethyl)amine, bis(2,2,2-trifluoroethyl)amine, bis(2,2,2-trichloroethyl)amine, bis(2,2,2-tribromoethyl)amine, bis(2,2,2-triiodoethyl)amine, bis(2,2,3,3,3-pentafluoropropyl)amine, bis(2,2,3,3,3-pentachloropropyl)amine, bis(2,2,3,3,3-pentabromopropyl)amine, bis(2,2,3,3,3-pentaiodopropyl)amine, bis(2,2,2-trifluoro-1-trifluoromethylethyl)amine, bis(2,2,2-trichloro-1-trichloromethylethyl)amine, bis(2,2,2-tribromo-1-tribromomethylethyl)amine, bis(2,2,2-triiodo-1-triiodomethylethyl)amine, bis(1,1-bis(trifluoromethyl)-2,2,2-trifluoroethyl)amine, bis(1,1-bis(trichloromethyl)-2,2,2-trichloroethyl)amine, bis(1,1-bis(tribromomethyl)-2,2,2-tribromoethyl)amine, bis(1,1-bis(triiodomethyl)-2,2,2-triiodoethyl)amine, bis(2-fluorophenyl)amine, bis(3-fluorophenyl)amine, bis(4-fluorophenyl)amine, bis(2-chlorophenyl)amine, bis(3-chlorophenyl)amine, bis(4-chlorophenyl)amine, bis(2-bromophenyl)amine, bis(3-bromophenyl)amine, bis(4-bromophenyl)amine, bis(2-iodophenyl)amine, bis(3-iodophenyl)amine, bis(4-iodophenyl)amine, bis(2,6-difluorophenyl)amine, bis(3,5-difluorophenyl)amine, bis(2,6-dichlorophenyl)amine, bis(3,5-dichlorophenyl)amine, bis(2,6-dibromophenyl)amine, bis(3,5-dibromophenyl)amine, bis(2,6-diiodophenyl)amine, bis(3,5-diiodophenyl)amine, bis(2,4,6-trifluorophenyl)amine, bis(2,4,6-trichlorophenyl)amine, bis(2,4,6-tribromophenyl)amine, bis(2,4,6-triiodophenyl)amine, bis(3,4,5-trifluorophenyl)amine, bis(3,4,5-trichlorophenyl)amine, bis(3,4,5-tribromophenyl)amine, bis(3,4,5-triiodophenyl)amine, bis(pentafluorophenyl)amine, bis(pentachlorophenyl)amine, bis(pentabromophenyl)amine, bis(pentaiodophenyl)amine, bis(2-(trifluoromethyl)phenyl)amine, bis(3-(trifluoromethyl)phenyl)amine, bis(4-(trifluoromethyl)phenyl)amine, bis(2,6-di(trifluoromethyl)phenyl)amine, bis(3,5-di(trifluoromethyl)phenyl)amine, bis(2,4,6-tri(trifluoromethyl)phenyl)amine, bis(3,4,5-tri(trifluoromethyl)phenyl)amine, bis(2-cyanophenyl)amine, bis(3-cyanophenyl)amine, bis(4-cyanophenyl)amine, bis(2-nitrophenyl)amine, bis(3-nitrophenyl)amine, bis(4-nitrophenyl)amine and the like. Further, phosphine compounds in which a nitrogen atom is replaced with a phosphorus atom in the above-mentioned amine compounds, and the like are also exemplified. Namely, those phosphine compounds are compounds in which "amine" described is rewritten as "phosphine".

When the compound (b) is an alcohol, specific examples thereof include fluoromethanol, chloromethanol, bromomethanol, iodomethanol, difluoromethanol, dichloromethanol, dibromomethanol, diiodomethanol, trifluoromethanol, trichloromethanol, tribromomethanol, triiodomethanol, 2,2,2-trifluoroethanol, 2,2,2-trichloroethanol, 2,2,2-tribromoethanol, 2,2,2-triiodoethanol, 2,2,3,3,3-pentafluoropropanol, 2,2,3,3,3-pentachloropropanol, 2,2,3, 3,3-pentabromopropanol, 2,2,3,3,3-pentaiodopropanol, 2,2,2-trifluoro-1-trifluoromethylethanol, 2,2,2-trichloro-1-trichloromethylethanol, 2,2,2-tribromo-1-tribromomethylethanol, 2,2,2-triiodo-1-triiodomethylethanol, 1,1-bis(trifluoromethyl)-2,2,2-trifluoroethanol, 1,1-bis(trichloromethyl)-2,2,2-trichloroethanol, 1,1-bis(tribromomethyl)-2,2,2-tribromoethanol, 1,1-bis(triiodomethyl)-2,2,2-triiodoethanol and the like. Further, thiol compounds in which an oxygen atom is replaced with a sulfur atom in the above-mentioned alcohol compounds, and the like are also exemplified. Namely, those thiol compounds are compounds in which, for example, methanol, ethanol and propanol are rewritten as methanethiol, ethanethiol and propanethiol, respectively.

When the compounds (b) are phenols, specific examples thereof include 2-fluorophenol, 3-fluorophenol, 4-fluorophenol, 2,4-difluorophenol, 2,6-difluorophenol, 3,4-difluorophenol, 3,5-difluorophenol, 3,4,5-trifluorophenol, 2,4,6-trifluorophenol, 2,3,5,6-tetrafluorophenol, pentafluorophenol, 2,3,5,6-tetrafluoro-4-trifluoromethylphenol, 2,3,5,6-tetrafluoro-4-pentafluorophenylphenol, perfluoro-1-naphthol, perfluoro-2-naphthol, 2-chlorophenol, 3-chlorophenol, 4-chlorophenol, 2,4-dichlorophenol, 2,6-dichlorophenol, 3,4-dichlorophenol, 3,5-dichlorophenol, 3,4,5-trichlorophenol, 2,4,6-trichlorophenol, 2,3,5,6-tetrachlorophenol, pentachlorophenol, 2,3,5,6-tetrachloro-4-trichloromethylphenol, 2,3,5,6-tetrachloro-4-pentachlorophenylphenol, perchloro-1-naphthol, perchloro-2-naphthol, 2-bromophenol, 3-bromophenol, 4-bromophenol, 2,4-dibromophenol, 2,6-dibromophenol, 3,4-dibromophenol, 3,5-dibromophenol, 3,4,5-tribromophenol, 2,4,6-tribromophenol, 2,3,5,6-tetrabromophenol, pentabromophenol, 2,3,5,6-tetrabromo-4-tribromomethylphenol, 2,3,5,6-tetrabromo-4-pentabromophenylphenol, perbromo-1-naphthol, perbromo-2-naphthol, 2-iodophenol, 3-iodophenol, 4-iodophenol, 2,4-diiodophenol, 2,6-diiodophenol, 3,4-diiodophenol, 3,5-diiodophenol, 3,4,5-triiodophenol, 2,4,6-triiodophenol, 2,3,5,6-tetraiodophenol, pentaiodophenol, 2,3,5,6-tetraiodo-4-triiodomethylphenol, 2,3,5,6-tetraiodo-4-pentaiodophenylphenol, periodo-1-naphthol, periodo-2-naphthol, 2-(trifluoromethyl)phenol, 3-(trifluoromethyl)phenol, 4-(trifluoromethyl)phenol, 2,6-bis(trifluoromethyl)phenol, 3,5-bis(trifluoromethyl)phenol, 2,4,6-tris(trifluoromethyl)phenol, 3,4,5-tris(trifluoromethyl)phenol, 2-cyanophenol, 3-cyanophenol, 4-cyanophenol, 2-nitrophenol, 3-nitrophenol, 4-nitrophenol and the like. Further, thiophenol compounds in which an oxygen atom is replaced with a sulfur atom in the above-mentioned phenol compounds, and the like are also exemplified. Namely, those thiophenol compounds are compounds in which "phenol" described is rewritten as "thiophenol".

The compound (b) is preferably, bis(trifluoromethyl)amine, bis(2,2,2-trifluoroethyl)amine, bis(2,2,3,3,3-pentafluoropropyl)amine, bis(2,2,2-trifluoro-1-trifluoromethylethyl)amine, bis(1,1-bis(trifluoromethyl)-2,2,2-trifluoroethyl)amine or bis(pentafluorophenyl)amine as amines; trifluoromethanol, 2,2,2-trifluoroethanol, 2,2,3,3,3-pentafluoropropanol, 2,2,2-trifluoro-1-trifluoromethylethanol or 1,1-bis(trifluoromethyl)-2,2,2-trifluoroethanol as alcohols; 2-fluorophenol, 3-fluorophenol, 4-fluorophenol, 2,6-difluorophenol, 3,5-difluorophenol, 3,4,5-trifluorophenol, 2,4,6-trifluorophenol, pentafluorophenol, 2-(trifluoromethyl)phenol, 3-(trifluoromethyl)phenol, 4-(trifluoromethyl)phenol, 2,6-bis(trifluoromethyl)phenol, 3,5-bis(trifluoromethyl)phenol, 2,4,6-tris(trifluoromethyl)phenol or 3,4,5-tris(trifluoromethyl)phenol as phenols.

The compound (b) is more preferably, bis(trifluoromethyl)amine, bis(pentafluorophenyl)amine, trifluoromethanol, 2,2,2-trifluoro-1-trifluoromethylethanol, 1,1-bis(trifluoromethyl)-2,2,2-trifluoroethanol, 2-fluorophenol, 3-fluorophenol, 4-fluorophenol, 2,6-difluorophenol, 3,5-difluorophenol, 2,4,6-trifluorophenol, 3,4,5-trifluorophenol, pentafluorophenol, 4-(trifluoromethyl)phenol, 2,6-bis(trifluoromethyl)phenol or 2,4,6-tris(trifluoromethyl)phenol, and further preferably 3,5-difluorophenol, 3,4,5-trifluorophenol, pentafluorophenol or 1,1-bis(trifluoromethyl)-2,2,2-trifluoroethanol.

The compounds (c) are preferably water, hydrogen sulfide, an alkylamine, arylamine, aralkylamine, halogenated alkylamine, halogenated arylamine, and (halogenated alkyl)arylamine, and specific examples thereof include water, hydrogen sulfide, methylamine, ethylamine, n-propylamine, isopropylamine, n-butylamine, sec-butylamine, tert-butylamine, isobutyl amine, n-pentylamine, neopentylamine, isopentylamine, amyl amine, n-hexylamine, n-octylamine, n-decyl amine, n-dodecyl amine, n-pentadecylamine, n-eicosylamine, allylamine, cyclopentadienylamine, aniline, 2-tolylamine, 3-tolylamine, 4-tolylamine, 2,3-xylylamine, 2,4-xylylamine, 2,5-xylylamine, 2,6-xylylamine, 3,4-xylylamine, 3,5-xylylamine, 2,3,4-trimethylaniline, 2,3,5-trimethylaniline, 2,3,6-trimethylaniline, 2,4,6-trimethylaniline, 3,4,5-trimethylaniline, 2,3,4,5-tetramethylaniline, 2,3,4,6-tetramethylaniline, 2,3,5,6-tetramethylaniline, pentamethylaniline, ethylaniline, n-propylaniline, isopropylaniline, n-butylaniline, sec-butylaniline, tert-butylaniline, n-pentylaniline, neopentylaniline, n-hexylaniline, n-octylaniline, n-decylaniline, n-dodecylaniline, n-tetradecylaniline, naphthylamine, anthracenylamine, benzylamine, (2-methylphenyl)methylamine, (3-methylphenyl)methylamine, (4-methylphenyl)methylamine, (2,3-dimethylphenyl)methylamine, (2,4-dimethylphenyl)methylamine, (2,5-dimethylphenyl)methylamine, (2,6-dimethylphenyl)methylamine, (3,4-dimethylphenyl)methylamine, (3,5-dimethylphenyl)methylamine, (2,3,4-trimethylphenyl)methylamine, (2,3,5-trimethylphenyl)methylamine, (2,3,6-trimethylphenyl)methylamine, (3,4,5-trimethylphenyl)methylamine, (2,4,6-trimethylphenyl)methylamine, (2,3,4,5-tetramethylphenyl)methylamine, (2,3,4,6-tetramethylphenyl)methylamine, (2,3,5,6-tetramethylphenyl)methylamine, (pentamethylphenyl)methylamine, (ethylplenyl)methylamine, (n-propylphenyl)methylamine, (isopropylphenyl)methylamine, (n-butylphenyl)methylamine, (sec-butylphenyl)methylamine, (tert-butylphenyl)methylamine, (n-pentylphenyl)methylamine, (neopentylphenyl)methylamine, (n-hexylphenyl)methylamine, (n-octylphenyl)methylamine, (n-decylphenyl)methylamine, (n-tetradecylphenyl)methylamine, naphtylmethylamine, anthracenylmethylamine, fluoromethylamine, chloromethylamine, bromomethylamine, iodomethylamine, difluoromethylamine, dichloromethylamine, dibromomethylamine, diiodomethylamine, trifluoromethylamine, trichloromethylamine, tribromomethylamine, triiodomethylamine, 2,2,2-trifluoroethylamine, 2,2,2-trichloroethylamine, 2,2,2-tribromoethylamine, 2,2,2-triiodoethylamine, 2,2,3,3,3-pentafluoropropylamine, 2,2,3,3,3-pentachloropropylamine, 2,2,3,3,3-pentabromopropylamine, 2,2,3,3,3-pentaiodopropylamine, 2,2,2-trifluoro-1-trifluoromethylethylamine, 2,2,2-trichloro-1-trichloromethylethylamine, 2,2,2-tribromo-1-tribromomethylethylamine, 2,2,2-triiodo-1-triiodomethylethylamine, 1,1-bis(trifluoromethyl)-2,2,2-trifluoroethylamine, 1,1-bis(trichloromethyl)-2,2,2-trichloroethylamine, 1,1-bis(tribromomethyl)-2,2,2-tribromoethylamine, 1,1-bis(triiodomethyl)-2,2,2-triiodoethylamine, perfluoroproylamine, perchloroproylamine, perbromoproylamine, periodoproylamine, perfluorobutylamine, perchlorobutylamine, perbromobutylamine, periodobutylamine, perfluoropentylamine, perchloropentylamine, perbromopentylamine, periodopentylamine, perfluorohexylamine, perchlorohexylamine, perbromohexylamine, periodohexylamine, perfluorooctylamine, perchlorooctylamine, perbromooctylamine, periodooctylamine, perfluorododecylamine, perchlorododecylamine, perbromododecylamine, periodododecylamine, perfluoropentadecylamine, perchloropentadecylamine, perbromopentadecylamine, periodopentadecylamine, perfluoroeicosylamine, perchloroeicosylamine, perbromoeicosylamine, periodoeicosylamine, 2-fluoroaniline, 3-fluoroaniline, 4-fluoroaniline, 2-chloroaniline, 3-chloroaniline, 4-chloroaniline, 2-bromoaniline, 3-bromoaniline, 4-bromoaniline, 2-iodoaniline, 3-iodoamine, 4-iodoaniline, 2,6-difluoroaniline, 3,5-difluoroaniline, 2,6-dichloroaniline, 3,5-dichloroaniline, 2,6-dibromoaniline, 3,5-dibromoaniline, 2,6-diiodoaniline, 3,5-diiodoaniline, 2,4,6-trifluoroaniline, 2,4,6-trichloroaniline, 2,4,6-tribromoaniline, 2,4,6-triiodoaniline, 3,4,5-trifluoroaniline, 3,4,5-trichloroaniline, 3,4,5-tribromoaniline, 3,4,5-triiodoaniline, pentafluoroaniline, pentachloroaniline, pentabromoaniline, pentaiodoaniline, 2-(trifluoromethyl)aniline, 3-(trifluoromethyl)aniline, 4-(trifluoromethyl)aniline, 2,6-di(trifluoromethyl)aniline, 3,5-di(trifluoromethyl)aniline, 2,4,6-tri(trifluoromethyl) aniline and 3,4,5-tri(trifluoromethyl)aniline; more preferably water, hydrogen sulfide, methylamine, ethylamine, n-propylamine, isopropylamine, n-butylamine, sec-butylamine, tert-butylamine, isobutyl amine, n-octylamine, aniline, 2,6-xylylamine, 2,4,6-trimethylaniline, naphthylamine, anthracenylamine, benzylamine, trifluoromethylamine, pentafluoroethylamine, perfluoropropylamine, perfluorobutylamine, perfluoropentylamine, perfluorohexylamine, perfluorooctylamine, perfluorododecylamine, perfluoropentadecylamine, perfluoroeicosylamine, 2-fluoroaniline, 3-fluoroaniline, 4-fluoroaniline, 2,6-difluoroaniline, 3,5-difluoroaniline, 2,4,6-trifluoroaniline, 3,4,5-trifluoroaniline, pentafluoroaniline, 2-(trifluoromethyl)aniline, 3-(trifluoromethyl)aniline, 4-(trifluoromethyl) aniline, 2,6-bis(trifluoromethyl)aniline, 3,5-bis(trifluoromethyl)aniline, 2,4,6-tris(trifluoromethyl)aniline or 3,4,5-tri(trifluoromethyl)aniline; in particular, preferably water, trifluoromethylamine, perfluorobutylamine, perfluorooctylamine, perfluoropentadecylamine, 2-fluoroaniline, 3-fluoroaniline, 4-fluoroaniline, 2,6-difluoroaniline, 3,5-difluoroaniline, 2,4,6-trifluoroaniline, 3,4,5-trifluoroaniline, pentafluoroaniline, 2-(trifluoromethyl)aniline, 3-(trifluoromethyl)aniline, 4-(trifluoromethyl)aniline, 2,6-bis(trifluoromethyl)aniline, 3,5-bis(trifluoromethyl)aniline, 2,4,6-tris(trifluoromethyl)aniline and 3,4,5-tri(trifluoromethyl) aniline; and most preferably water and pentafluoroaniline.

As the particles (d), there can be preferably used those which are generally used as a carrier. A porous substance having a narrow distribution of particle diameter is preferred and an inorganic substance or an organic polymer is preferably used, and inorganic substance is more preferably used. As the particles (d), from the distribution of obtained polymer diameter, the geometrical standard deviation of the particle diameters based on volume preferably 2.5 or less, more preferably 2.0 or less, most preferably 1.7 or less.

Examples of the inorganic substance which can be used as the particles (d) in the present invention include inorganic oxides and magnesium compounds, and clays and clay minerals can also be used unless no problem arises. These inorganic substances may be used in combination.

Specific examples of the inorganic oxide include $SiO_2$, $Al_2O_3$, $MgO$, $ZrO_2$, $TiO_2$, $B_2O_3$, $CaO$, $ZnO$, $BaO$, $ThO_2$ and mixtures thereof such as $SiO_2$—$MgO$, $SiO_2$—$Al_2O_3$, $SiO_2$—$TiO_2$, $SiO_2$—$V_2O_5$, $SiO_2$—$Cr_2O_3$, $SiO_2$—$TiO_2$—$MgO$, etc. Among these inorganic oxides, $SiO_2$ and/or $Al_2O_3$ are preferred, and SiO2 is particularly preferred. The above inorganic oxide may contain a small amount of carbonate, sulfate, nitrate and oxide components, such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$, $Li_2O$, etc.

Examples of the clay or clay mineral include kaolin, bentonite, Kibushi clay, gaerome clay, allophane, hisingerite, pyrophylite, talc, a mica group, a montmorillinite group, vermiculite, a chlorite group, palygorskite, kaolinite, nacrite, dickite, halloycite and the like. Among them, smectite, montmorillinite, hectorite, raponite and saponite are preferred, and montmorillinite and hectorite are more preferred. Among inorganic substances, inorganic oxides are preferably used.

It is necessary that these inorganic substances are dried to substantially remove water, and those dried by a heat treatment are preferred. The heat treatment is normally carried out at the temperature of 100 to 1500° C., preferably 100 to 1000° C., and more preferably 200 to 800° C. The heating time is not particularly limited, but preferably 10 minutes to 50 hours, more preferably 1 to 30 hours. Further, during the heat treatment, there can be used a method of flowing a dried inert gas (e.g. nitrogen, argon) at a fixed flow rate or a method of evacuating, but the method is not limited.

The average particle diameter of the inorganic substance is preferably from 5 to 1000 μm, more preferably from 10 to 500 μm, and most preferably from 10 to 100 μm. The pore volume is preferably not less than 0.1 ml/g, and more preferably 0.3 to 10 ml/g. The specific surface area is preferably from 10 to 1000 $m^2/g$, and more preferably from 100 to 500 $m^2/g$.

As the organic polymer used as the particles (d) in the present invention, any organic polymer may be used and a mixture of plural kinds of organic polymer may also be used.

As the organic polymer which can be used as the particles (d), a polymer having a functional group containing active hydrogen or a non-proton donative Lewis basic functional group is preferred.

The functional group containing active hydrogen may be any one containing an active hydrogen, and is not specifically limited, Specific examples thereof include a primary amino group, secondary amino group, imino group, amide group, hydrazide group, amidino group, hydroxy group, hydroperoxy group carboxyl group, formyl group, carbamoyl group, sulfonic acid group, sulfinic acid group, sulfenic acid group, thiol group, thioformyl group, pyrrolyl group, imidazolyl group, piperidyl group, indazolyl group, carbazolyl group and the like. Among them, a primary amino group, secondary amino group, imino group, amide group, hydroxy group, formyl group, carboxyl group, sulfonic acid group or thiol group is preferred. A primary amino group, secondary amino group, amide group or hydroxy group is particularly preferred. These groups may be substituted with a halogen atom or a hydrocarbon group having 1 to 20 carbon atoms.

The non-proton donative Lewis basic functional group may be any functional group having a Lewis basic portion containing no active hydrogen atom, and is not specifically limited. Specific examples thereof include pyridyl group, N-substituted imidazolyl group, N-substituted indazolyl group, nitrile group, azido group, N-substituted imino group, N,N-substituted amino group, N,N-substituted aminoxy group, N,N,N-substituted hydrazino group, nitroso group, nitro group, nitroxy group, furyl group, carbonyl group, thiocarbonyl group, alkoxy group, alkyloxycarbonyl group, N,N-substituted carbamoyl grop, thioalkoxy group, substituted sulfinyl group, substituted sulfonyl group, substituted sulfonic acid group and the like. A heterocyclic group is preferred, and an aromatic heterocyclic group having an oxygen atom and/or a nitrogen atom in the ring is more preferred. Among them, pyridyl group, N-substituted imidazolyl group and N-substituted indazoyl groups are particularly preferred and pyridyl group is most preferred. These groups may be substituted with a halogen atom or a hydrocarbon group having 1 to 20 carbon atoms.

The amount of the functional group containing active hydrogen or non-proton donative Lewis basic functional group is not specifically limited, but is preferably from 0.01 to 50 mmol/g, and more preferably from 0.1 to 20 mmol/g, in terms of a molar amount of the functional group per g of the organic polymer.

The organic polymer having said functional group can be obtained, for example, by polymerizing a monomer having a functional group containing active hydrogen or a non-proton donative Lewis basic functional group and one or more polymerizable unsaturated group, or by copolymerizing this monomer and another monomer having a polymerizable unsaturated group. At this time, it is preferred to copolymerize the above monomers with a crosslinking polymerizable monomer having two or more polymerizable unsaturated bonds.

Examples of the monomer having a functional group containing active hydrogen or a non-proton donative Lewis basic functional group include the above monomer having a functional group containing active hydrogen, and a polymerizable unsaturated group or monomer having a functional group having a Lewis basic portion containing no active hydrogen, and a polymerizable unsaturated group.

Examples of the polymerizable unsaturated group include alkenyl groups such as vinyl group, allyl group and the like: alkynyl groups such as ethyne group and the like. Examples of the monomer having a functional group containing active hydrogen and one or more polymerizable unsaturated groups include a vinyl group-containing primary amine, vinyl group-containing secondary amine, vinyl group-containing amide compound and vinyl group-containing hydroxy compound. Specific examples thereof include N-(1-ethenyl) amine, N-(2-propenyl)amine, N-(1-ethenyl)-N-methylamine, N-(2-propenyl)-N-methylamine, 1-ethenylamide, 2-propenylamide, N-methyl-(1-ethenyl)amide, N-methyl-(2-propenyl)amide, vinyl alcohol, 2-propen-1-ol, 3-buten-1-ol and the like.

Specific examples of the monomer having a functional group having a Lewis basic portion containing no active hydrogen, and one or more polymerizable unsaturated groups include vinylpyridine, vinyl(N-substituted)imidazole and vinyl(N-substituted)indazole.

The other monomers having a polymerizable unsaturated group include ethylene, α-olefins, aromatic vinyl compounds and the like, and specific examples thereof include ethylene, propylene, butene-1, hexene-1, 4-methyl-pentene-1, styrene and the like. Among them, ethylene or styrene is preferred. Two or more kinds of these monomers may be used.

Specific examples of the crosslinking polymerizable monomer having two or more polymerizable unsaturated groups include divinylbenzene and the like.

The average particle diameter of the organic polymer is preferably from 5 to 1000 μm, and more preferably from 10 to 500 μm. The pore volume is preferably not less than 0.1 ml/g, and more preferably 0.3 to 10 ml/g. The specific surface area is preferably from 10 to 1000 m²/g, and more preferably from 50 to 500 m²/g.

It is preferable that these organic polymers are dried to substantially remove water, and for example, those dried by a heat treatment are preferred. The heat treatment is normally carried out at the temperature of 30 to 400° C., preferably 50 to 200° C., and more preferably 75 to 150° C. The heating time is not particularly limited, but preferably 30 minutes to 50 hours, more preferably 1 to 30 hours. Further, during the heat treatment, there can be used a method of flowing a dried inert gas (e.g. nitrogen, argon) at a fixed flow rate or a method of evacuating, but the method is not limited.

The order of contact of (a), (b), (c) and (d) is not particularly restricted, and the following orders are listed.

<1> A contacted substance obtained by contacting a contacted substance of (a) and (b) with (c) is contacted with (d).

<2> A contacted substance obtained by contacting a contacted substance of (a) and (b) with (d) is contacted with (c).

<3> A contacted substance obtained by contacting a contacted substance of (a) and (c) with (b) is contacted with (d).

<4> A contacted substance obtained by contacting a contacted substance of (a) and (a) with (d) is contacted with (b).

<5> A contacted substance obtained by contacting a contacted substance of (a) and (d) with (b) is contacted with (c).

<6> A contacted substance obtained by contacting a contacted substance of (a) and (d) with (c) is contacted with (b).

<7> A contacted substance obtained by contacting a contacted substance of (b) and (e) with (a) is contacted with (d).

<8> A contacted substance obtained by contacting a contacted substance of (b) and (c) with (d) is contacted with (a).

<9> A contacted substance obtained by contacting a contacted substance of (b) and (d) with (a) is contacted with (c).

<10> A contacted substance obtained by contacting a contacted substance of (b) and (d) with (c) is contacted with (a).

<11> A contacted substance obtained by contacting a contacted substance of (c) and (d) with (a) is contacted with (b).

<12> A contacted substance obtained by contacting a contacted substance of (a) and (d) with (b) is contacted with (a).

Preferable contact orders are described in <1>, <2>, <11> and <12>.

The contact treatment is preferably conducted under an inert gas atmosphere. The treating temperature is usually from −100 to 300° C., preferably from −80 to 200° C. The treating time is usually from 1 minute to 200 hours, preferably from 10 minutes to 100 hours. Further, the treatment may use a solvent, or these compounds may be treated directly without using a solvent.

As this solvent, those which do not react with components to be contacted in use of the solvent and do not react with contacted substances obtained by contact are usually used. As described above, when components are allowed to contact step by step, there is a case, for example, in which even a solvent reacting with the above-mentioned component (a) does not react with a contacted substance obtained by contact of the component (a) with other components, and in such a case, this solvent can be used as a solvent in a contact operation using the above-mentioned contacted substance as one component. Solvents exemplified below may thus properly be used considering contacted substances and components to be contacted. Given as examples of solvents which can be used are non-polar solvents such as aliphatic hydrocarbon solvents, aromatic hydrocarbon solvents and the like, and polar solvents such as halide solvents, ethereal solvents, alcoholic solvents, phenolic solvent, carbonyl-based solvents, phosphoric acid derivatives, nitrile solvents, nitro compounds, amine-based solvents, sulfur compounds and the like. Specific examples thereof include aliphatic hydrocarbon solvents such as butane, pentane, hexane, heptane, octane, 2,2,4-trimethylpentane, cyclohexane and the like, aromatic hydrocarbon solvents such as benzene, toluene, xylene and the like, halide solvents such as dichloromethane, dichlorodifluoromethane chloroform, 1,2-dichloroethane, 1,2-dibromoethane, 1,1,2-trichloro-1,2,2-trifluoroethane, tetrachloroethylene, chlorobenzene, bromobenzene, o-dichlorobenzene and the like, ethereal solvents such as dimethyl ether, diethyl ether, diisopropyl ether, di-n-butyl ether, methyl-tert-butyl-ether, anisole, 1,4-dioxane, 1,2-dimethoxyethane, bis(2-methoxyethyl) ether, tetrahydrofuran, tetrahydropyran and the like, alcoholic solvents such as methanol, ethanol, 1-propanol, 2-propanol, 1-butanol, 2-butanol, 2-methyl-1-propanol, 3-methyl-1-butanol, cyclohexanol, benzyl alcohol, ethylene glycol, propylene glycol, 2-methoxyethanol, 2-ethoxyethanol, diethylene glycol, triethylene glycol, glycerine and the like, phenolic solvents such as phenol, p-cresol and the like, carbonyl-based solvents such as acetone, ethyl methyl ketone, cyclohexanone, acetic anhydride, ethyl acetate, butyl acetate, ethylene carbonate, propylene carbonate, N,N-dimethylformamide, N,N-dimethylacetamide, N-methyl-2-pyrrolidone and the like, phosphoric acid derivatives such as hexamethylphosphoric triamide, triethyl phosphate and the like, nitrile solvents such as acetonitrile, propionitrile, succinonitrlle, benzonitrile and the like, nitro compounds such as nitromethane, nitrobenzene and the like, amine-based solvents such as pyridine, piperidine, morpholine and the like, sulfur compounds such as dimethyl sulfoxide, sulfolane and the like.

In the cases of contacting a contacted substance (e) obtained by contact of (a), (b) and (c), with a particle (d), namely, in the above-mentioned cases <1>, <3> and <7>, the solvent (s1) in producing the contacted substance (e) is preferably selected from the above-mentioned aliphatic hydrocarbon solvents, aromatic hydrocarbon solvents and ethereal solvents.

On the other hand, the solvent (s2) in contacting the contacted substance (e) with a particle (d) is preferably a polar solvent. As the index representing polarity of a solvent, $E_T^N$ value (C. Reichardt, "Solvents and Solvents Effects in Organic Chemistry", 2-nd ed., VCH Verlag (1988)) and the like are known, and solvents satisfying $0.8 \geq E_T^N \geq 0.1$ are particularly preferable. Examples of such polar solvents include dichloromethane, dichlorodifluoromethane chloroform, 1,2-dichloroethane, 1,2-dibromoethane, 1,1,2-trichloro-1,2,2-trifluoroethane, tetrachloroethylene, chlorobenzene, bromobenzene, o-dichlorobenzene, dimethylether, diethyl ether, diisopropyl ether, di-n-butyl ether, methyl-tert-butyl-ether, anisole, 1,4-dioxane, 1,2-dimethoxyethane, bis(2-methoxyethyl) ether, tetrahydrofuran, tetrahydropyran, methanol, ethanol, 1-propanol, 2-propanol, 1-butanol, 2-butanol, 2-methyl-1-propanol, 3-methyl-1-butanol, cyclohexanol, benzyl alcohol, ethylene glycol, propylene glycol, 2-methoxyethanol, 2-ethoxyethanol, diethylene glycol, triethylene glycol, acetone, ethyl methyl ketone, cyclohexanone, acetic anhydride, ethyl acetate, butyl acetate, ethylene carbonate, propylene carbonate, N,N-dimethylformamide, N,N-dimethylacetamide, N-methyl-2-pyrrolidone, hexamethylphosphoric triamide, triethyl phosphate, acetonitrile, propionitrile, succinonitrlle, benzonitrile, nitromethane, nitrobenzene, ethylenediamine, pyridine, piperidine, morpholine, dimethyl sulfoxide, sulfolane and the like. The solvent (s2) is further preferably dimethyl ether, diethyl ether, diisopropyl ether, di-n-butyl ether, methyl-tert-butyl ether, anisole, 1,4-dioxane, 1,2-dimethoxyethane, bis (2-methoxyethyl) ether, tetrahydrofuran, tetrahydropyrane, methanol, ethanol, 1-propaol, 2-propanol, 1-butanol, 2-butanol, 2-methyl-1-propanol, 3-methyl-1-butanol, cyclohexanol, benzyl alcohol, ethylene glycol, propylene glycol, 2-methoxyethanol, 2-ethoxyethanol, diethylene glycol or triethylene glycol, particularly preferably di-n-butyl ether, methyl-tert-butyl ether, 1,4-dioxane, tetrahydrofuran, methanol, ethanol, 1-propanol, 2-propanol, 1-butanol, 2-butanol, 2-methyl-1-propanol, 3-methyl-1-butanol or cyclohexanol, and most preferably tetrahydrofuran, methanol, ethanol, 1-propanol or 2-propanol.

As the above-mentioned solvents (s2), mixed solvents of these polar solvents with hydrocarbon solvents can also be used. As the hydrocarbon solvent, the above-exemplified aliphatic hydrocarbon solvents and aromatic hydrocarbon solvents are used. Specific examples of the mixed solvent of a polar solvent and a hydrocarbon solvent include a hexane/methanol mixed solvent, hexane/ethanol mixed solvent, hexane/1-propanol mixed solvent, hexane/2-propanol mixed solvent, heptane/methanol mixed solvent, heptane/ethanol mixed solvent, heptane/1-propanol mixed solvent, heptane/2-propanol mixed solvent, toluene/methanol mixed solvent, toluene/ethanol mixed solvent, toluene/1-propanol mixed solvent, toluene/2-propanol mixed solvent, xylene/methanol mixed solvent, xylene/ethanol mixed solvent, xylene/1-propanol mixed solvent, xylene/2-propanol mixed solvent and the like. Preferable are a hexane/methanol mixed solvent, hexane/ethanol mixed solvent, heptane/methanol mixed solvent, heptane/ethanol mixed solvent, toluene/methanol mixed solvent, toluene/ethanol mixed solvent, xylene/methanol mixed solvent and xylene/ethanol mixed solvent. Further preferable are a hexane/methanol mixed solvent, hexane/ethanol mixed solvent, toluene/methanol mixed solvent and toluene/ethanol mixed solvent. The most preferable is a toluene/ethanol mixed solvent.

The ethanol proportion in a toluene/ethanol mixed solvent is preferably from 10 to 50% by volume, further preferably from 15 to 30% by volume.

In the cases of contacting a contacted substance (e) obtained by contact of (a), (b) and (c), with a particle (d), namely, in the above-mentioned cases <1>, <3> and <7>, both of the solvent (s1) and the solvent (s2) can be selected from hydrocarbon solvents, and in this case, it is preferable that the time interval after contact of (a), (b) and (c) before contacting the resulted contacted substance (e) with a particle (d) is shorter. The time interval is preferably from 0 to 5 hours, further preferably from 0 to 3 hours, most preferably from 0 to 1 hour. The temperature in contact of the contacted substance (e) with a particle (d) is usually from −100° C. to 40° C., preferably from −20° C. to 20° C., most preferably from −10° C. to 10° C.

In the above-mentioned cases <2>, <5>, <6>, <8>, <9>, <10>, <11>and <12>, any of the above-mentioned non-polar solvent and the polar solvent can be used, and the non-polar solvent is more preferable. The reason for this is that since a contacted substance of (a) and (c) and a contacted substance obtained by contacting a contacted substance of (a) and (b), with (c) generally have low solubility in a non-polar solvent, when (d) is present in the reaction system in producing these contacted substances, a condition in which the produced contacted substance deposits on the surface of (d) is more stable than a condition in which the contacted substance is present in a non-polar solvent, leading to easier solidification.

The use amounts of the above-mentioned compounds (a), (b) and (c) are not particularly restricted, however, it is preferable that, if the molar ratio of use amounts of these compounds is described as (a):(b):(c)=1:y:z, y and z substantially satisfy the following formula (1):

$$|m-y-2z| \leq 1 \quad (1)$$

(in the above-mentioned formula (1), m represents the valency of $M^1$).

In the above-mentioned formula (1), y represents preferably a number of from 0.01 to 1.99, more preferably a number of from 0.10 to 1.80, further preferably a number of from 0.20 to 1.50, and most preferably a number of from 0.30 to 1.00, and the preferable range of z in the above-mentioned formula (1) is determined by m, y and the formula (1).

In an actual contact treatment of compounds, even if uses of compounds are designed so as to completely satisfy the above-mentioned formula (1), use amount may vary slightly in some cases, and it is usual to slightly regulate use amounts appropriately in view of the amounts of compounds remaining unreacted. Here, the term "substantially satisfy the formula (1)" means that a case of obtaining the intended substance by contacting compounds in the molar ratio satisfying the above-mentioned formula (1) is included even if the above-mentioned formula (1) is not completely satisfied.

In preparation of a modified particle (I), the amount of a typical metal atom derived from (a) contained in the resulted particle by contact of (a) with (d) based on the molar number of typical metal atoms contained in 1 g of the resulted particle is preferably 0.1 mmol or more and more preferably 0.5 to 20 mmol, therefore, the amount of (d) based on the amount of (a) may advantageously be determined appropriately so as to realize such a range.

After the above-mentioned contact treatment, heating is also preferably conducted for more progress of the reaction. In heating, it is preferable to use a solvent having a higher boiling point to provide higher temperature, therefore, the solvent used in the contact treatment may also be substituted by other solvent having a higher boiling point.

In the modified particle (I), raw materials (a), (b), (c) and/or (c) may remain as unreacted substances, as a result of such a contact treatment. However, when applied to polymerization accompanied by formation of an addition polymer particle, it is preferable to effect previously a washing treatment for removing unreacted substances. The solvent used in this treatment may be the same as or different from the solvent in contact.

Further, it is preferable that, after such a contact treatment and a washing treatment, a solvent is distilled off from the product, and then, drying is conducted at temperatures of 25° C. or more under a reduced pressure for 1 to 24 hours. This drying is conducted more preferably at temperatures from 40 to 200° C. for 1 to 24 hours, more preferably at temperatures from 60 to 200° C. for 1 to 24 hours, particularly preferably at temperatures from 60 to 160° C. for 2 to 18 hours, most preferably at temperatures from 80 to 160° C. for 4 to 18 hours.

(II) Modified Particles Obtained by Contacting Aluminoxane (f) with Particles (d)

As an aluminoxane (f) used for preparation the modified particles (II), an cyclic aluminoxane (C1) having a structure represented by the general formula $\{—Al(E^2)-O—\}_b$, and/or a linear aluminoxane (C2) having a structure represented by the general formula $E^3\{—Al(E^3)-O—\}_cAlE^3_2$ (wherein $E^2$ and $E^3$ respectively represent a hydrocarbon group, all of $E^2$ and $E^3$ may be the same or different, b represents an integer of not less than 2, and c represents an integer of not less than 1.)

As the hydrocarbon group in $E^2$ or $E^3$, a hydrocarbon group having 1 to 8 carbon atoms is preferable and an alkyl group is more preferable.

Specific examples of $E^2$ and $E^3$ in the cyclic aluminoxane having a structure represented by the general formula $\{—Al(E_2)-O—\}_b$ and the linear aluminoxane having a structure represented by the general formula $E^3-\{Al(E^3)-O—\}_cAlE^3_2$ include alkyl groups such as a methyl group, an ethyl group, a n-propyl group, an isopropyl group, a n-butyl group, an isobutyl group, a n-pentyl group, a neopentyl group, etc. b is an integer of not less than 2, c is an integer of not less than 1. Preferably, each of $E^2$ and $E^3$ is independently a methyl group or an isobutyl group, b is from 2 to 40 and c is from 1 to 40.

The above aluminoxane is prepared by various methods. The method is not specifically limited and the aluminoxane may be prepared according to a publicly known method. For example, the aluminoxane is prepared by contacting a solution obtained by dissolving a trialkylaluminum (e.g. trimethylaluminum) in a suitable organic solvent (e.g. benzene, toluene aliphatic hydrocarbon) with water. Also, there can be illustrated a method for preparing the aluminoxane by contacting a trialkylaluminum (e.g. trimethylaluminum, etc.) with a metal salt containing crystal water (e.g. copper sulfate hydrate, etc.). It is assumed that the aluminoxane prepared by such methods is a mixture of a cyclic aluminoxane and linear aluminoxane.

Aluminoxane (f) and a particle (d) can be contacted by any method to produce a modified particle (II). More specifically, the particle (II) can be produced by dispersing particles (d) into a solvent and adding aluminoxane (f) to this.

As the solvent in this case, any of the above-mentioned solvents can be used, and those not reacting with aluminoxane (f) are preferable, and solvents dissolving aluminoxane (f) are more preferable. Specifically, aromatic hydrocarbon solvents such as benzene, toluene, xylene and the like or aliphatic hydrocarbon solvents such as hexane, heptane, octane and the like are preferable, and toluene or xylene is further preferable.

The contact temperature and time can be arbitrary determined, and the temperature is usually from −100° C. to 200° C., preferably from −50° C. to 150° C. further preferably from −20° C. to 120° C. Particularly in the reaction initiation period, the reaction is preferably conducted at lower temperatures for suppressing heat generation. The contact amount can be arbitrary selected, however, the amount of aluminoxane (f) per unit gram of a particle (d) is usually from 0.01 to 100 mmol, preferably from 0.1 to 20 mmol, further preferably from 1 to 10 mmol in terms of an aluminum atom.

(III) A Modified Particle Obtained by Contact of Aluminoxane (f), Particle (d) and Transition Metal Component (g)

The modified particle (III) is obtained by further using a transition metal component (g) in preparing a modified particle (II).

As the transition metal component (g), transition metal compounds of III to XI groups or lanthanide series described later are used.

The contact of aluminoxane (f), particle (d) and transition metal component (g) is effected by any method, to produce a modified particle (III). In this operation, a solvent is preferably used, and as this solvent, any of the above-mentioned solvents can be used, and those not reacting with aluminoxane (f) and transition metal component (g) are preferable, and solvents dissolving aluminoxane (f) and transition metal component (g) are more preferable. Specifically, aromatic hydrocarbon solvents such as toluene, xylene and the like or aliphatic hydrocarbon solvents such as hexane, heptane, octane and the like are preferable, and toluene or xylene is further preferable.

The contact temperature and time can be arbitrary determined, and the temperature is usually from −100° C. to 200° C., preferably from −50° C. to 150° C., further preferably from −20° C. to 120° C. Particularly in the reaction initiation period, the reaction is preferably conducted at lower temperatures for suppressing heat generation. The contact amount can be arbitrary selected, however, the amount of aluminoxane (f) per unit gram of a particle (d) is usually from 0.01 to 100 mmol, preferably from 0.1 to 20 mmol, further preferably from 1 to 10 mmol in terms of an aluminum atom. Further, the amount of a transition metal component (g) per unit gram of a particle (d) is usually from 0.1 to 1000 μmol, preferably from 1 to 500 μmol, further preferably from 10 to 200 μmol in terms of a transition metal atom.

A homogeneous type solid catalyst component produced in the present invention can be contacted with other necessary catalyst component to obtain a catalyst for addition polymerization.

When a homogeneous type solid catalyst component does not contain a transition metal component, transition metal components are usually listed as the other essential component. Further, in this case, it is preferable to further use an organometal component together. For example, as the addition polymerization catalyst obtained by using the above-mentioned modified particle (I) or (II), addition polymerization catalysts obtained by contacting (A) a modified particle of the formula (I) or (II) and (B) a transition metal compound of III to XI groups and lanthanide series, and addition polymerization catalysts obtained by contacting (A) a modified particle of the formula (I) or (II), (B) a transition metal compound of III to XI groups and lanthanide series and the following aluminum compound (C), are listed.

(C) One or more aluminum compounds selected from the following (C1) to (C3)

(C1) Organoaluminum compound of the general formula $E^1_a AlZ_{3-a}$ (C2) Cyclic aluminoxane having a structure of the general formula $\{-Al(E^2)-O-\}_b$ (C3) Linear aluminoxane having a structure of the general formula $E^3\{-Al(E^3)-O-\}_c AlE^3_2$ (wherein, each of $E^1$, $E^2$ and $E^3$ represents a hydrocarbon group, and all $E^1$s, all $E^2$s and all $E^3$s may be the same or different. Z represents a hydrogen atom or halogen atom, and all Zs may be the same or different. a represents a number satisfying $0<a\leq 3$, b represents an integer of 2 or more, and c represents an integer of 1 or more.).

When a homogeneous type solid catalyst component contains a transition metal component, organometal components are usually listed as the other necessary component. For example, addition polymerization catalysts obtained by contacting (A) a modified particle of the formula (III) and the above-mentioned aluminum compound (C), are listed.

A homogeneous type solid catalyst produced by the invention is used as an addition polymerization catalyst, however, a more preferable addition polymerization catalyst can be obtained by using an organometallic compound together. For example, a modified particle of the formula (III) can be used as an addition polymerization catalyst, however, a more preferable addition polymerization catalyst can be obtained by contacting the above-mentioned aluminum compound (C).

The above-mentioned compounds are specifically described below.

(B) Transition Metal Compound of the Group III to XI or Lanthanide Series

As a transition metal compound (B) of the Group III to XI or Lanthanide series of the Periodic Table of the Elements, a transition metal compound forming a single-site catalyst is used, and it is not particularly restricted so far as it is a transition metal compound of the Group III to XI or Lanthanide series exhibiting an addition polymerization activity when the modified particle (A) of (I) and (II) described above (or aluminum compound (c), further) is used as a co-catalyst component for activation. Example of the transition metal compound includes a transition metal compound indicated by the general formula [4] described below, a μ-oxo type transition metal compound obtained by reacting the transition metal compound with water as a dimer thereof, and the like.

$$L^2_a M^2 X_b \qquad [4]$$

(wherein $M^2$ is a transition metal atom of the Group III to Group XI or Lanthanide Series of the Periodic Table; $L^2$ is a group having a cyclopentadienyl type anion skeleton or a group containing a hetero-atom, and a plurality of $L^2$ groups may be optionally linked in direct, or through a group containing a carbon atom, a silicone atom, a nitrogen atom, an oxygen atom, a sulfur atom or a phosphorus atom; X is a halogen atom, a hydrocarbon group having 1 to 20 carbon atoms excluding the group having a cyclopentadienyl type anion skeleton, or hydrocarbonoxy group; a represents a numeral satisfying an equation of $0<a\leq 8$; b represents a numeral satisfying an equation of $0<b\leq 8$; and a and b are properly selected so that the transition metal compound become neutral taking into account of the valency of the transition metal $M^2$ and the valencies of $L^2$ and X.

In the general formula [4] representing the transition metal compound, $M^2$ is a transition metal atom of the Group III to Group XI or Lanthanide Series of the Periodic Table (IUPAC 1989). Specific examples of the transition metal atom include a scandium atom, yttrium atom, titanium atom, zirconium atom, hafnium atom, vanadium atom, niobium atom, tantalum atom, chromium atom, iron atom, ruthenium atom, cobalt atom, rhodium atom, nickel atom, palladium atom, samarium atom, ytterbium atom and the like, preferably a titanium atom, zirconium atom, hafnium atom, vanadium atom, chromium atom, iron atom, cobalt atom or nickel atom, and more preferably a titanium atom, zirconium atom or hafnium atom.

In the general formula [4], $L^2$ is a group having a cyclopentadienyl type anion skeleton or a group containing a hetero-atom, and a plurality of $L^2$ groups may be the same or different. Further, $L^2$ groups may be optionally linked in direct, or through a group containing a carbon atom, silicone atom, nitrogen atom, oxygen atom, sulfur atom or phosphorus atom.

A group having a cyclopentadienyl type anion skeleton in $L^2$ includes an $\eta^5$-cyclopentadienyl group, $\eta^5$-substituted cyclopentadienyl group, $\eta^5$-indenyl group, $\eta^5$-substituted indenyl group, $\eta^5$-fluorenyl group, $\eta^5$-substituted fluorenyl group and the like. Specific examples include an $\eta^5$-cyclopentadienyl group, $\eta^5$-methylcyclopentadienyl group, $\eta^5$-tert-butylcyclopentadienyl group, $\eta^5$-1,2-dimethylcyclopentadienyl group, $\eta^5$-1,3-dimethylcyclopentadienyl group, $\eta^5$-1-tert-butyl-2-methylcyclopentadienyl group, $\eta^5$-1-tert-butyl-3-methylcyclopentadienyl group, $\eta^5$-1-methyl-2-isopropylcyclopentadienyl group, $\eta^5$-1-methyl-3-isopropylcyclopentadienyl group, $\eta^5$-1,2,3-trimethylcyclopentadienyl group, $\eta^5$-1,2,4-trimethylcyclopentadienyl group, $\eta^5$-tetramethylcyclopentadienyl group, $\eta^5$-pentamethylcyclopentadienyl group, $\eta^5$-indenyl group, $\eta^5$-4,5,6,7-tetrahydroindenyl group, $\eta^5$-2-methylindenyl group, $\eta^5$-3-methylindenyl group, $\eta^5$-4-methylindenyl group, $\eta^5$-5-methylindenyl group, $\eta^5$-6-methylindenyl group, $\eta^5$-7-methylindenyl group, $\eta^5$-2-tert-butylindenyl group, $\eta^5$-3-tert-butylindenyl group, $\eta^5$-4-tert-butylindenyl group, $\eta^5$-5-tert-butylindenyl group, $\eta^5$-6-tert-butylindenyl group, $\eta^5$-7-tert-butylindenyl group, $\eta^5$-2,3-dimethylindenyl group, $\eta^5$-4,7-dimethylindenyl group, $\eta^5$-2,4,7-trimethylindenyl group, $\eta^5$-2-methyl-4-isopropylindenyl group, $\eta^5$-4,5-benzindenyl group, $\eta^5$-2-methyl-4,5-benzindenyl group, $\eta^5$-4-phenylindenyl group, $\eta^5$-2-methyl-5-phenylindenyl group, $\eta^5$-2-methyl-4-phenylindenyl group, $\eta^5$-2-methyl-4-naphthylindenyl group, an $\eta^5$-fluorenyl group, $\eta^5$-2,7-dimethylfluorenyl group, $\eta^5$-2,7-di-tert-butylfluorenyl group (herein-after, $\eta^5$ may be omitted for simplifying), and substitution products thereof, etc.

The hetero-atom in the group containing a hetero-atom includes an oxygen atom, sulfur atom, nitrogen atom, phosphorus atom and the like, and examples thereof include an alkoxy group, aryloxy group, thioalkoxy group, thioaryloxy group, alkylamino group, arylamino group, alkylphosphino group, arylphosphino group, a chelating ligand or an aromatic or aliphatic heterocyclic group having an oxygen atom, sulfur atom, nitrogen atom and/or phosphorus atom in its ring.

Specific examples of the group containing a hetero-atom include a methoxy group, an ethoxy group, a n- or isopropoxy group, a n-, sec-, iso- or tert-butoxy group, a phenoxy group, a 2-methylphenoxy group, a 2,6-dimethylphenoxy group, a 2,4,6-trimethylphenoxy group, a 2-ethylphenoxy group, a 4-n-propylphenoxy group, a 2-isopropylphenoxy group, a 2,6-diisopropylphenoxy group, a 4-sec-butylphenoxy group, a 4-tert-butylphenoxy group, a 2,6-di-sec-butylphenoxy group, a 2-tert-butyl-4-methylphenoxy group, a 2,6-di-tert-butylphenoxy group, a 4-methoxyphenoxy group, a 2,6-dimethoxyphenoxy group, a 3,5-dimethoxyphenoxy group, a 2-chlorophenoxy group, a 4-nitrosophenoxy group, a 4-nitrophenoxy group, a 2-aminophenoxy group, a 3-aminophenoxy group, a 4-aminothiophenoxy group, a 2,3,6-trichlorophenoxy group, a 2,4,6-trifluorophenoxy group, a thiomethoxy group, a dimethylamino group, a diethylamino group, a di-n- or isopropylamino group, a diphenylamino group, an isopropylamino group, a tert-butylamino group, a pyrrolyl group, a dimethylphosphino group, a 2-(2-oxy-1-propyl)phenoxy group, catechol, resorcinol, 4-isopropylcatechol, 3-methoxycatechol, a 1,8-dihydroxynahpthyl group, a 1,2-dihydroxynahpthyl group, a 2,2'-biphenyldiol group, a 1,1'-bi-2-naphthol group, a 2,2'-dihydroxy-6,6'-dimethylbiphenyl group, a 4,4',6,6'-tetra-tert-butyl-2,2'-methylenediphenoxy group, a 4,4',6,6'-tetramethyl-2,2'-isobutylidenediphenoxy group and the like.

Further, the hetero atom-containing group includes a group represented by the formula [5];

$R_3P=N-$                 [5]

(wherein respective R represents a hydrogen atom, halogen atom or hydrocarbon group, R groups may be the same or different, and two or more of them may be bonded mutually and may form a ring.)

Specific Examples of R include a hydrogen atom, fluorine atom, chlorine atom, bromine atom, iodine atom, methyl group, ethyl group, n-propyl group, isopropyl group, n-butyl group, tert-butyl group, cyclopropyl group, cyclobutyl group, cycloheptyl group, cyclohexyl group, phenyl group, 1-naphtyl group, 2-naphtyl group, benzyl group and the like, but are not limited thereto.

Further, the hetero atom-containing group also includes a group represented by the general formula [6]:

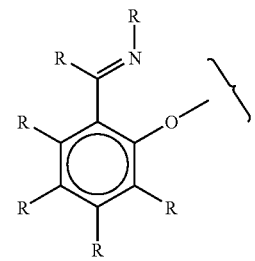

[6]

(wherein respective R groups independently represent a hydrogen atom, halogen atom, hydrocarbon group, halogenated hydrocarbon group, hydrocarbon oxy group, silyl group or amino group, they may be the same or different, and two or more of them may be bonded mutually and may form a ring.)

Specific Examples of R in the general formula [6] include a hydrogen atom, fluorine atom, chlorine atom, bromine atom, iodine atom, phenyl group, 1-naphtyl group, 2-naphtyl group, tert-butyl group, 2,6-dimethylphenyl group, 2-fluorenyl group, 2-methylphenyl group, 4-trifluoromethylphenyl group, 4-methoxyphenyl group, 4-pyridyl group, cyclohexyl group, 2-isopropylphenyl group, benzyl group, methyl group, triethylsilyl group, diphenylmethylsilyl group, 1-methy-1-phenylethyl group, 1,1-dimethyl propyl group, 2-chlorophenyl group, pentafluorophenyl group and the like, but are not limited thereto.

Further, the chelating ligand means a ligand having a plural number of coordinating positions, and specific examples include acetylacetonate, diimine, oxazoline, bisoxazoline, terpyridine, acylhydrazone, diethylenetriamine, triethylenetetramine, porphyrin, a crown ether, a cryptate and the like.

Specific examples of hetero-cyclic group described above include a pyridil group, N-substituted imidazolyl group or N-substituted indazolyl group, preferably a pyridil group.

The mutual groups having the cyclopentadienyl type anion skeleton, the group having a cyclopentadienyl type anion skeleton and the group containing a hetero-atom, or the mutual groups containing a hetero-atom may be directly linked, or may be linked through a group containing a carbon atom, a silicone atom, a nitrogen atom, an oxygen atom, a sulfur atom or a phosphorus atoms respectively. Preferable examples of the group include a bivalent group having a atom, linking two $L^2$, such as a carbon atom, a silicone atom, a nitrogen atom, an oxygen atom, a sulfur atom and/or a phosphorus atom. Further, more preferably, an atom linking two $L^2$ is a carbon atom, a silicone atom, a nitrogen atom, an oxygen atom, a sulfur atom, and/or a phosphorus atom and a bivalent groups of which minimum number of atom linking between two $L^2$ is 3 or less. Examples of the group include alkylene groups such as a methylene group, an ethylene group, a propylene group and the like, substituted alkylene groups such as a dimethylmethylene group, a diphenylmethylene group and the like, or a silylene group, substituted silylene groups such as a dimethylsilylene group, a diphenylsilylene group, a tetramethyldisilylene group and the like, or hetero-atoms such as a nitrogen atom, an oxygen atom, a sulfur atom and/or a phosphorus atom and the like, etc. Further a methylene group, an ethylene group, dimethylmethylene(isopropylidene), dimethylsilylene, diethylsilylene or diphenylsilylene are particularly preferred.

X in the general formula [4] representing the transition metal compound is a halogen atom, a hydrocarbon group excluding the group having a cyclopentadienyl type anion skeleton, or hydrocarbon oxy group. Specific examples of a halogen atom include a fluorine atom, a chlorine atom, a bromine atom, an iodine atom, and examples of the hydrocarbon group include alkyl groups, aralkyl groups, aryl groups and the like, preferably an alkyl group having 1 to 20 carbon atoms, aralkyl group having 7 to 20 carbon atoms, or aryl group having 6 to 20 carbon atoms.

The alkyl group having 1 to 20 carbon atoms includes a methyl group, an ethyl group, a n-propyl group, an isopropyl group, a n-butyl group, a sec-butyl group, a tert-butyl group, an isobutyl group, a n-pentyl group, a neopentyl group, a sec-amyl group, a n-hexyl group, a n-octyl group, a n-decyl group, a n-dodecyl group, a n-pentadecyl group, a n-eicosyl group and the like, and a methyl group, an ethyl group, an isopropyl group, a tert-butyl group or an isobutyl group or a sec-amyl group is more preferable.

All of these alkyl groups may be substituted with a halogen atom such as a fluorine atom, a chlorine atom, a bromine atom or an iodine atom. Examples of the alkyl group having 1 to 10 carbon atoms which is substituted with the halogen atom, include a fluoromethyl group, a trifluoromethyl group, a chloromethyl group, a trichloromethyl group, a fluoroethyl group, a pentafluoroethyl group, a perfluoropropyl group, a perfluorobutyl group, a perfluorohexyl group, a perfluorooctyl group, a perchloropropyl group, a perchlorobutyl group, a perbromopropyl group and the like.

Further, all of these alkyl groups may be partially substituted with an alkoxy group such as a methoxy group, an ethoxy group or the like, an aryloxy group such as a phenoxy group or the like or an aralkyloxy group such as a benzyloxy group or the like, etc.

The aralkyl group having 7 to 20 carbon atoms includes a benzyl group, a (2-methylphenyl)methyl group, a (3-methylphenyl)methyl group, a (4-methylphenyl)methyl group, a (2,3-dimethylphenyl)methyl group, a (2,4-dimethylphenyl)methyl group, a (2,5-dimethylphenyl)methyl group, a (2,6-dimethylphenyl)methyl group, a (3,4-dimethylphenyl)methyl group, a (3,5-dimethylphenyl)methyl group, a (2,3,4-timethylphenyl)methyl group, a (2,3,5-timethylphenyl)methyl group, a (2,3,6-timethylphenyl)methyl group, a (3,4,5-timethylphenyl)methyl group, a (2,4,6-timethylphenyl)methyl group, a (2,3,4,5-tetramethylphenyl)methyl group, a (2,3,4,6-tetramethylphenyl)methyl group, a (2,3,5,6-tetramethylphenyl)methyl group, a (pentamethylphenyl)methyl group, an (ethylphenyl)methyl group, a (n-propylphenyl)methyl group, an (isopropylphenyl)methyl group, a (n-butylphenyl)methyl group, a (sec-butylphenyl)methyl group, a (tert-butylphenyl)methyl group, a (n-pentylphenyl)methyl group, a (neopentylphenyl)methyl group, a (n-hexylphenyl methyl group, a (n-octylphenyl)methyl group, a (n-decylphenyl)methyl group, a (n-dodecylphenyl)methyl group, a naphthylmethyl group, an anthracenylmethyl group and the like, and a benzyl group is more preferable.

All of these aralkyl groups may be partially substituted with a halogen atom such as a fluorine atom, a chlorine atom, a bromine atom or an iodine atom, an alkoxy group such as a methoxy group, an ethoxy group or the like, an aryloxy group such as a phenoxy group or the like or an aralkyloxy group such as a benzyloxy group or the like, etc.

The aryl group having 6 to 20 carbon atoms includes a phenyl group, a 2-tolyl group, a 3-tolyl group, a 4-tolyl group, a 2,3-xylyl group, a 2,4-xylyl group, a 2,5-xylyl group, a 2,6-xylyl group, a 3,4-xylyl group, a 3,5-xylyl group, a 2,3,4-trimethylphenyl group, a 2,3,5-trimethylphenyl group, a 2,3,6-trimethylphenyl group, a 2,4,6-trimethylphenyl group, a 3,4,5-trimethylphenyl group, a 2,3,4,5-tetramethylphenyl group, a 2,3,4,6-tetramethylphenyl group, a 2,3,5,6-tetramethylphenyl group, a pentamethylphenyl group, an ethylphenyl group, a n-propylphenyl group, an isopropylphenyl group, a n-butylphenyl group, a sec-butylphenyl group, a tert-butylphenyl group, a n-pentylphenyl group, a neopentylphenyl group, a n-hexylphenyl group, a n-octylphenyl group, a n-decylphenyl group, a n-dodecylphenyl group, a n-tetradecylphenyl group, a naphthyl group, an anthracenyl group and the like, and a phenyl group is more preferable.

All of these aryl groups may be partially substituted with a halogen atom such as a fluorine atom, a chlorine atom, a bromine atom or an iodine atom, an alkoxy group such as a methoxy group, an ethoxy group or the like, an aryloxy group such as a phenoxy group or the like or an aralkyloxy group such as a benzyloxy group or the like, etc.

Herein, the hydrocarbonoxy group includes an alkoxy group, aralkyloxy group, aryloxy group and the like, preferably an alkyloxy group having 1 to 20 carbon atoms, aralkyloxy group having 7 to 20 carbon atoms, or aryloxy group having 6 to 20 carbon atoms.

The alkoxy group having 1 to 20 carbon atoms includes a methoxy group, an ethoxy group, a n-propoxy group, an isopropoxy group, a n-butoxy group, a sec-butoxy group, a tert-butoxy group, a n-pentoxy group, a neopentoxy group, a n-hexoxy group, a n-octoxy group, a n-dodecoxy group, a n-pentadecoxy group, a n-eicosoxy group and the like, and a methoxy group, an ethoxy group, an isopropoxy group or a tert-butoxy group is preferable.

All of these alkoxy groups may be partially substituted with a halogen atom such as a fluorine atom, a chlorine atom, a bromine atom or an iodine atom, an alkoxy group such as a methoxy group, an ethoxy group or the like, an aryloxy group such as a phenoxy group or the like or an aralkyloxy group such as a benzyloxy group or the like, etc.

The aralkyloxy group having 7 to 20 carbon atoms includes a benzyloxy group, a (2-methylphenyl)methoxy group, a (3-methylphenyl)methoxy group, a (4-methylphenyl)methoxy group, a (2,3-dimethylphenyl)methoxy group, a (2,4-dimethylphenyl)methoxy group, a (2,5-dimethylphenyl)methoxy group, a (2,6-dimethylphenyl)methoxy group, a (3,4-dimethylphenyl)methoxy group, a (3,5-dimethylphenyl)methoxy group, a (2,3,4-trimethylphenyl)methoxy group, a (2,3,5-trimethylphenyl)methoxy group, a (2,3,6-trimethylphenyl)methoxy group, a (2,4,5-trimethylphenyl)methoxy group, a (2,4,6-trimethylphenyl)methoxy group, a (3,4,5-trimethylphenyl)methoxy group, a (2,3,4,5-tetramethylphenyl)methoxy group, a (2,3,4,6-tetramethylphenyl)methoxy group, a (2,3,5,6-tetramethylphenyl)methoxy group, a (pentamethylphenyl)methoxy group, an (ethylphenyl)methoxy group, a (n-propylphenyl)methoxy group, an (isopropylphenyl)methoxy group, (n-butylphenyl)methoxy group, a (sec-butylphenyl)methoxy group, a (tert-butylphenyl)methoxy group, a (n-hexylphenyl)methoxy group, a (n-octylphenyl)methoxy group, a (n-decylphenyl)methoxy group, a naphthylmethoxy group, an anthracenylmethoxy group and the like, and a benzyloxy group is more preferable.

All of these aralkyloxy groups may be partially substituted with a halogen atom such as a fluorine atom, a chlorine atom, a bromine atom or an iodine atom, an alkoxy group such as a methoxy group, an ethoxy group or the like, an aryloxy group such as a phenoxy group or the like or an aralkyloxy group such as a benzyloxy group or the like, etc.

The aryloxy group having 6 to 20 carbon atoms includes a phenoxy group, a 2-methylphenoxy group, a 3-methylphenoxy group, a 4-methylphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2-tert-butyl-3-methylphenoxy group, a 2-tert-butyl-4-methylphenoxy group, a 2-tert-butyl-5-methylphenoxy group, a 2-tert-butyl-6-methylphenoxy group, a 2,3,4-trimethylphenoxy group, a 2,3,5-trimethylphenoxy group, a 2,3,6-trimethylphenoxy group, a 2,4,5-trimethylphenoxy group, a 2,4,6-trimethylphenoxy group, a 2-tert-butyl-3,4-dimethylphenoxy group, a 2-tert-butyl-3,5-dimethylphenoxy group, a 2-tert-butyl-3,6-dimethylphenoxy group, a 2,6-di-tert-butyl-3-methylphenoxy group, a 2-tert-butyl-4,5-dimethylphenoxy group, a 2,6-di-tert-butyl-4-methylphenoxy group, a 3,4,5-trimethylphenoxy group, a 2,3,4,5-tetramethylphenoxy group, a 2-tert-butyl-3,4,5-trimethylphenoxy group, a 2,3,4,6-tetramethylphenoxy group, a 2-tert-butyl-3,4,6-trimethylphenoxy group, a 2,6-di-tert-butyl-3,4-dimethylphenoxy group, a 2,3,5,6-tetramethylphenoxy group, a 2-tert-butyl-3,5,6-trimethylphenoxy group, a 2,6-di-tert-butyl-3,5-dimethylphenoxy group, pentamethylphenoxy group, an ethylphenoxy group, a n-propylphenoxy group, an isopropylphenoxy group, a n-butylphenoxy group, a sec-butylphenoxy group, a tert-butylphenoxy group, a n-hexylphenoxy group, a n-octylphenoxy group, a n-decylphenoxy group, a n-tetradecylphenoxy group, a naphthoxy group, an anthracenoxy group and the like.

All of these aryloxy groups may be partially substituted with a halogen atom such as a fluorine atom, a chlorine atom, a bromine atom or an iodine atom, an alkoxy group such as a methoxy group, an ethoxy group or the like, an aryloxy group such as a phenoxy group or the like or an aralkyloxy group such as a benzyloxy group or the like, etc.

As X, a chlorine atom, methyl group, ethyl group, n-propyl group, isopropyl group, n-butyl group, methoxy group, ethoxy group, n-propoxy group, isopropoxy group, n-butoxy group, trifluoromethoxy group, phenyl group, phenoxy group, 2,6-di-tert-butylphenoxy group, 3,4,5-trifluorophenoxy group, pentafluorophenoxy group, 2,3,5,6-tetrafluoropentafluorophenyl group or benzyl group is more preferable.

Among the transition metal compounds, specific examples of the compound in which a transition metal is a titanium atom include bis(cyclopentadienyl)titanium dichloride, bis(methylcyclopentadienyl)titanium dichloride, bis(n-butylcyclopentadienyl)titanium dichloride, bis(dimethylcyclopentadienyl)titanium dichloride, bis(ethylmethylcyclopentadienyl)titanium dichloride, bis(n-buthylmethylcyclopentadienyl)titanium dichloride, bis(trimethylcyclopentadienyl)titanium dichloride, bis(tetramethylcyclopentadienyl)titanium dichloride, bis(pentamethylcyclopentadienyl)titanium dichloride, bis(indenyl)titanium dichloride, bis(4,5,6,7-tetrahydroindenyl)titanium dichloride, bis(fluorenyl)titanium dichloride, bis(2-phenylindenyl)titanium dichloride, bis[2-(bis-3,5-trifluoromethylphenyl)indenyl]titanium dichloride, bis[2-(4-tert-buthylphenyl)indenyl]titanium dichloride, bis[2-(4-trifluoromethylphenyl)indenyl]titanium dichloride, bis[2-(4-methylphenyl)indenyl]titanium dichloride, bis[2-(3,5-dimethylphenyl)indenyl]titanium dichloride, bis[2-(pentafluorophenyl)indenyl]titanium dichloride, cyclopentadienyl(pentamethylcyclopentadienyl)titanium dichloride, cyclopentadienyl(indenyl)titanium dichloride, cyclopentadienyl(fluorenyl)titanium dichloride, indenyl(fluorenyl)titanium dichloride, pentamethylcyclopentadienyl(indenyl)titanium dichloride, pentamethylcyclopentadienyl(fluorenyl)titanium dichloride, cyclopentadienyl(2-phenylindenyl)titanium dichloride, pentamethylcyclopentadienyl(2-phenylindenyl)titanium dichloride, ethylenebis(cyclopentadienyl)titanium dichloride, ethylenebis(2-methylcyclopentadienyl)titanium dichloride, ethylenebis(3-methylcyclopentadienyl)titanium dichloride, ethylenebis(2-n-butylcyclopentadienyl)titanium dichloride, ethylenebis(3-n-butylcyclopentadienyl)titanium dichloride, ethylenebis(2,3-dimethylcyclopentadienyl)titanium dichloride, ethylenebis(2,4-dimethylcyclopentadienyl)titanium dichloride, ethylenebis(2,5-dimethylcyclopentadienyl)titanium dichloride, ethylenebis(3,4-dimethylcyclopentadienyl)titanium dichloride, ethylenebis(2,3-ethylmethylcyclopentadienyl)titanium dichloride, ethylenebis(2,4-ethylmethylcyclopentadienyl)titanium dichloride, ethylenebis(2,5-ethylmethylcyclopentadienyl)titanium dichloride, ethylenebis(3,5-ethylmethylcyclopentadienyl)titanium dichloride, ethylenebis(2,3,4-trimethylcyclopentadienyl)titanium dichloride, ethylenebis(2,3,5-trimethylcyclopentadienyl)titanium dichloride, ethylenebis(tetramethylcyclopentadienyl)titanium dichloride, ethylenebis(indenyl)titanium dichloride, ethylenebis(4,5,6,7-tetrahydroindenyl)titanium dichloride, ethylenebis(2-phenylindenyl)titanium dichloride, ethylenebis(2-methylindenyl)titanium dichloride, ethylenebis(2-methyl-4-phenylindenyl)titanium dichloride, ethylenebis(2-methyl-4-naphthylindenyl)titanium dichloride, ethylenebis(2-methyl-4,5-benzoindenyl)titanium dichloride, ethylenebis(fluorenyl)titanium dichloride, ethylene(cyclopentadienyl)(pentamethylcyclopentadienyl)titanium dichloride, ethylene(cyclopentadienyl)(indenyl)titanium dichloride, ethylene(methylcyclopentadienyl)(indenyl)titanium dichloride, ethylene(n-butylcyclopentadienyl)(indenyl)titanium dichloride, ethylene(tetramethylcyclopentadienyl)(indenyl)titanium dichloride, ethylene(cyclopentadienyl)(fluorenyl)titanium dichloride, ethylene(methylcyclopentadienyl)(fluorenyl)titanium dichloride, ethylene(pentamethylcyclopentadienyl)(fluorenyl)titanium dichloride, ethylene n-butylcyclopentadienyl)(fluorenyl)titanium dichloride, ethylene (tetramethylpentadienyl)(fluorenyl)titanium dichloride, ethylene(indenyl)(fluorenyl)titanium dichloride, isopropylidenebis(cyclopentadienyl)titanium dichloride, isopropylidenebis(2-methylcyclopentadienyl)titanium dichloride, isopropylidenebis(3-methylcyclopentadienyl)titanium dichloride, isopropylidenebis(2-n-butylcyclopentadienyl)titanium dichloride, isopropylidenebis(3-n-butylcyclopentadienyl) titanium dichloride, isopropylidenebis(2,3-dimethylcyclopentadienyl)titanium dichloride, isopropylidenebis(2,4-dimethylcyclopentadienyl)titanium dichloride, isopropylidenebis(2,5-dimethylcyclopentadienyl)titanium dichloride, isopropylidenebis(3,4-dimethylcyclopentadienyl)titanium dichloride, isopropylidenebis(2,3-ethylmethylcyclopentadienyl)titanium dichloride, isopropylidenebis(2,4-ethylmethylcyclopentadienyl)titanium dichloride, isopropylidenebis(2,5-ethylmethylcyclopentadienyl)titanium dichloride, isopropylidenebis(3,5-ethylmethylcyclopentadienyl)titanium dichloride, isopropylidenebis(2,3,4-trimethylcyclopentadienyl)titanium dichloride, isopropylidenebis(2,3,5-trimethylcyclopentadienyl)titanium dichloride, isopropylidenebis(tetramethylcyclopentadienyl)titanium dichloride, isopropylidenebis(indenyl)titanium dichloride, isopropylidenebis(4,5,6,7-tetrahydroindenyl)titanium dichloride, isopropylidenebis(2-phenylindenyl)titanium dichloride, isopropylidenebis(2-methylindenyl)titanium dichloride, isopropylidenebis(2-methyl-4-phenylindenyl)titanium dichloride, isopropylidenebis(2-methyl-4-naphthylindenyl)titanium dichloride, isopropylidenebis(2-methyl-4,5-benzoindenyl)titanium dichloride, isopropylidenebis(fluorenyl)titanium dichloride, isopropylidene(cyclopentadienyl)(tetramethylcyclopentadienyl)titanium dichloride, isopropylidene(cyclopentadienyl)(indenyl)titanium dichloride, isopropylidene(methylcyclopentadienyl)(indenyl)titanium dichloride, isopropylidene(n-butylcyclopentadienyl)(indenyl)titanium dichloride, isopropylidene(tetramethylcyclopentadienyl)(indenyl)titanium dichloride, isopropylidene (cyclopentadienyl)(fluorenyl)titanium dichloride, isopropylidene(methylcyclopentadienyl)(fluorenyl)titanium dichloride, isopropylidene(n-butylcyclopentadienyl)(fluorenyl)titanium dichloride, isopropylidene (tetramethylcyclopentadienyl)(fluorenyl)titanium dichloride, isopropylidene (indenyl)(fluorenyl)titanium dichloride, dimethylsilylenebis(cyclopentadienyl)titanium dichloride, dimethylsilylenebis(2-methylcyclopentadienyl)titanium dichloride, dimethylsilylenebis(3-methylcyclopentadienyl)titanium dichloride, dimethylsilylenebis(2-n-butylcyclopentadienyl) titanium dichloride, dimethylsilylenebis(3-n-butylcyclopentadienyl)titanium dichloride, dimethylsilylenebis(2,3-dimethylcyclopentadienyl)titanium dichloride, dimethylsilylenebis(2,4-dimethylcyclopentadienyl)titanium dichloride, dimethylsilylenebis(2,5-dimethylcyclopentadienyl)titanium dichloride, dimethylsilylenebis(3,4-dimethylcyclopentadienyl)titanium dichloride, dimethylsilylenebis(2,3-ethylmethylcyclopentadienyl)titanium dichloride, dimethylsilylenebis(2,4-ethylmethylcyclopentadienyl)titanium dichloride, dimethylsilylenebis(2,5-ethylmethylcyclopentadienyl)titanium dichloride, dimethylsilylenebis(3,5-ethylmethylcyclopentadienyl)titanium dichloride, dimethylsilylenebis(2,3,4-trimethylcyclopentadienyl)titanium dichloride, dimethylsilylenebis(2,3,5-trimethylcyclopentadienyl)titanium dichloride, dimethylsilylenebis(tetramethylcyclopentadienyl)-titanium dichloride, dimethylsilylenebis(indenyl)titanium dichloride, dimethylsilylenebis(4,5,6,7-tetrahydroindenyl)titanium dichloride, dimethylsilylenebis(2-methylindenyl)titanium dichloride, dimethylsilylenebis(2-methyl-4-phenylindenyl)titanium dichloride, dimethylsilylenebis(2-methyl-4-naphthylindenyl)titanium dichloride, dimethylsilylenebis(2-methyl-4,5-benzoindenyl)titanium dichloride, dimethylsilylene(cyclopentadienyl)(indenyl)titanium dichloride, dimethylsilylene (methylcyclopentadienyl)(indenyl)titanium dichloride, dimethylsilylene(n-butylcyclopentadienyl)(indenyl)titanium dichloride, dimethylsilylene(tetramethylcyclopentadienyl)(indenyl)titanium dichloride, dimethylsilylene (cyclopentadienyl)(fluorenyl)titanium dichloride, dimethylsilylene (methylcyclopentadienyl)(fluorenyl)titanium dichloride, dimethylsilylene(n-butylcyclopentadienyl)(fluorenyl)titanium dichloride, dimethylsilylene-(tetramethylcyclopentadienyl)(indenyl)titanium dichloride, dimethylsilylene-(indenyl)(fluorenyl)titanium dichloride, cyclopentadienyltitanium trichloride, pentamethylcyclopentadienyltitanium trichloride, cyclopentadienyl(dimethylamido)titanium dichloride, cyclopentadienyl(phenoxy)titanium dichloride, cyclopentadienyl(2,6-dimethylphenyl)titanium dichloride, cyclopentadienyl(2,6-diisopropylphenyl)titanium dichloride, cyclopentadienyl(2,6-di-tert-butylphenyl) titanium dichloride, pentamethylcyclopentadienyl(2,6-dimethylphenyl)titanium dichloride, pentamethylcyclopentadienyl(2,6-diisopropylphenyl)titanium dichloride, pentamethylcyclopentadienyl(2,6-di-tert-butylphenyl)titanium dichloride, indenyl(2,6-diisopropylphenyl)titanium dichloride, fluorenyl-(2,6-diisopropylphenyl)titanium dichloride, methylene(cyclopentadienyl)(3,5-dimethyl-2-phenoxy)titanium dichloride, methylene(cyclopentadienyl)(3-tert-butyl-2-phenoxy)titanium dichloride, methylene(cyclopentadienyl)(3-tert-butyl-5-methyl-2-phenoxy)titanium dichloride, methylene(cyclopentadienyl)(3-phenyl-2-phenoxy)titanium dichloride, methylene(cyclopentadienyl)(3-tert-butyldimethylsilyl-5-methyl-2-phenoxy)titanium dichloride, methylene(cyclopentadienyl)(3-trimethylsilyl-5-methyl-2-phenoxy)titanium dichloride, methylene(cyclopentadienyl)(3-tert-butyl-5-methoxy-2-phenoxy)titanium dichloride, methylene(cyclopentadienyl)(3-tert-butyl-5-chloro-2-phenoxy)titanium dichloride, methylene(methylcyclopentadienyl)(3,5-dimethyl-2-phenoxy)titanium dichloride, methylene(methylcyclopentadienyl)(3-tert-butyl-2-phenoxy) titanium dichloride, methylene(methylcyclopentadienyl)(3-tert-butyl-5-methyl-2-phenoxy)titanium dichloride, methylene(methylcyclopentadienyl)(3-phenyl-2-phenoxy) titanium dichloride, methylene(methylcyclopentadienyl)(3-tert-butyldimethylsilyl-5-methyl-2-phenoxy)titanium dichloride, methylene(methylcyclopentadienyl)(3-trimethylsilyl-5-methyl-2-phenoxy)titanium dichloride, methylene (methylcyclopentadienyl)(3-tert-butyl-5-methoxy-2-phenoxy)titanium dichloride, methylene (methylcyclopentadienyl)(3-tert-butyl-5-chloro-2-phenoxy) titanium dichloride, methylene(tert-butylcyclopentadienyl) (3,5-dimethyl-2-phenoxy)titanium dichloride, methylene (tert-butylcyclopentadienyl)(3-tert-butyl-2-phenoxy) titanium dichloride, methylene(tert-butylcyclopentadienyl) (3-tert-butyl-5-methyl-2-phenoxy)titanium dichloride, methylene(tert-butylcyclopentadienyl)(3-phenyl-2-phenoxy)titanium dichloride, methylene(tert-butylcyclopentadienyl)(3-tert-butyldimethylsilyl-5-methyl-2-phenoxy)titanium dichloride, methylene(tert-butylcyclopentadienyl)(3-trimethylsilyl-5-methyl-2-phenoxy)titanium dichloride, methylene(tert-butylcyclopentadienyl)(3-tert-butyl-5-methoxy-2-phenoxy)titanium dichloride, methylene(tert-butylcyclopentadienyl)(3-tert-butyl-5-chloro-2-phenoxy)titanium dichloride, methylene(tetramethylcyclopentadienyl)(3,5-dimethyl-2-phenoxy)titanium dichloride, methylene(tetramethylcyclopentadienyl)(3-tert-butyl-2-phenoxy)titanium dichloride, methylene(tetramethylcyclopentadienyl)(3-tert-butyl-5-methyl-2-phenoxy)titanium dichloride, methylene(tetramethylcyclopentadienyl)(3-phenyl-2-phenoxy)titanium dichloride, methylene(tetramethylcyclopentadienyl)(3-tert-butyldimethylsilyl-5-methyl-2-phenoxy)titanium dichloride, methylene(tetramethylcyclopentadienyl)(3-trimethylsilyl-5-methyl-2-phenoxy)titanium dichloride, methylene(tetramethylcyclopentadienyl)(3-tert-butyl-5-methoxy-2-phenoxy)titanium dichloride, methylene(tetramethylcyclopentadienyl)(3-tert-butyl-5-chloro-2-phenoxy)titanium dichloride, methylene(trimethylsilylcyclopentadienyl)(3,5-dimethyl-2-phenoxy)titanium dichloride, methylene(trimethylsilylcyclopentadienyl)(3-tert-butyl-2-phenoxy)titanium dichloride, methylene(trimethylsilylcyclopentadienyl)(3-tert-butyl-5-methyl-2-phenoxy)titanium dichloride, methylene(trimethylsilylcyclopentadienyl)(3-phenyl-2-phenoxy)titanium dichloride, methylene(trimethylsilylcyclopentadienyl)(3-tert-butyldimethylsilyl-5-methyl-2-phenoxy)titanium dichloride, methylene(trimethylsilylcyclopentadienyl)(3-trimethylsilyl-5-methyl-2-phenoxy)titanium dichloride, methylene(trimethylsilylcyclopentadienyl)(3-tert-butyl-5-methoxy-2-phenoxy)titanium dichloride, methylene(trimethylsilylcyclopentadienyl)(3-tert-butyl-5-chloro-2-phenoxy)titanium dichloride, methylene(fluorenyl)(3,5-dimethyl-2-phenoxy)titanium dichloride, methylene(fluorenyl)(3-tert-butyl-2-phenoxy)titanium dichloride, methylene(fluorenyl)(3-tert-butyl-5-methyl-2-phenoxy)titanium dichloride, methylene(fluorenyl)(3-phenyl-2-phenoxy)titanium dichloride, methylene(fluorenyl)(3-tert-butyldimethylsilyl-5-methyl-2-phenoxy)titanium dichloride, methylene(fluorenyl)(3-trimethylsilyl-5-methyl-2-phenoxy)titanium dichloride, methylene(fluorenyl)(3-tert-butyl-5-methoxy-2-phenoxy)titanium dichloride, methylene(fluorenyl)(3-tert-butyl-5-chloro-2-phenoxy)titanium dichloride, isopropylidene(cyclopentadienyl)(3,5-dimethyl-2-phenoxy)titanium dichloride, isopropylidene(cyclopentadienyl)(3-tert-butyl-2-phenoxy)titanium dichloride, isopropylidene(cyclopentadienyl)(3-tert-butyl-5-methyl-2-phenoxy)titanium dichloride, isopropylidene(cyclopentadienyl)(3-phenyl-2-phenoxy)titanium dichloride, isopropylidene(cyclopentadienyl)(3-tert-butyldimethylsilyl-5-methyl-2-phenoxy)titanium dichloride, isopropylidene(cyclopentadienyl)(3-trimethylsilyl-5-methyl-2-phenoxy)titanium dichloride, isopropylidene(cyclopentadienyl)(3-tert-butyl-5-methoxy-2-phenoxy)titanium dichloride, isopropylidene(cyclopentadienyl)(3-tert-butyl-5-chloro-2-phenoxy)titanium dichloride, isopropylidene(methylcyclopentadienyl)(3,5-dimethyl-2-phenoxy)titanium dichloride, isopropylidene(methylcyclopentadienyl)(3-tert-butyl-2-phenoxy)titanium dichloride, isopropylidene(methylcyclopentadienyl)(3-tert-butyl-5-methyl-2-phenoxy)titanium dichloride, isopropylidene(methylcyclopentadienyl)(3-phenyl-2-phenoxy)titanium dichloride, isopropylidene(methylcyclopentadienyl)(3-tert-butyldimethylsilyl-5-methyl-2-phenoxy)titanium dichloride, isopropylidene(methylcyclopentadienyl)(3-trimethylsilyl-5-methyl-2-phenoxy)titanium dichloride, isopropylidene(methylcyclopentadienyl)(3-tert-butyl-5-methoxy-2-phenoxy)titanium dichloride, isopropylidene(methylcyclopentadienyl)(3-tert-butyl-5-chloro-2-phenoxy)titanium dichloride, isopropylidene(tert-butylcyclopentadienyl)(3,5-dimethyl-2-phenoxy)titanium dichloride, isopropylidene(tert-butylcyclopentadienyl)(3-tert-butyl-2-phenoxy)titanium dichloride, isopropylidene(tert-butylcyclopentadienyl)(3-tert-butyl-5-methyl-2-phenoxy)titanium dichloride, isopropylidene(tert-butylcyclopentadienyl)(3-phenyl-2-phenoxy)titanium dichloride, isopropylidene(tert-butylcyclopentadienyl)(3-tert-butyldimethylsilyl-5-methyl-2-phenoxy)titanium dichloride, isopropylidene(tert-butylcyclopentadienyl)(3-trimethylsilyl-5-methyl-2-phenoxy)titanium dichloride, isopropylidene(tert-butylcyclopentadienyl)(3-tert-butyl-5-methoxy-2-phenoxy)titanium dichloride, isopropylidene(tert-butylcyclopentadienyl)(3-tert-butyl-5-chloro-2-phenoxy)titanium dichloride, isopropylidene(tetramethylcyclopentadienyl)(3,5-dimethyl-2-phenoxy)titanium dichloride, isopropylidene(tetramethylcyclopentadienyl)(3-tert-butyl-2-phenoxy)titanium dichloride, isopropylidene(tetramethylcyclopentadienyl)(3-tert-butyl-5-methyl-2-phenoxy)titanium dichloride, isopropylidene(tetramethylcyclopentadienyl)(3-phenyl-2-phenoxy)titanium dichloride, isopropylidene(tetramethylcyclopentadienyl)(3-tert-butyldimethylsilyl-5-methyl-2-phenoxy)titanium dichloride, isopropylidene(tetramethylcyclopentadienyl)(3-trimethylsilyl-5-methyl-2-phenoxy)titanium dichloride, isopropylidene(tetramethylcyclopentadienyl)(3-tert-butyl-5-methoxy-2-phenoxy)titanium dichloride, isopropylidene(tetramethylcyclopentadienyl)(3-tert-butyl-5-chloro-2-phenoxy)titanium dichloride, isopropylidene(trimethylsilylcyclopentadienyl)(3,5-dimethyl-2-phenoxy)titanium dichloride, isopropylidene(trimethylsilylcyclopentadienyl)(3-tert-butyl-2-phenoxy)titanium dichloride, isopropylidene(trimethylsilylcyclopentadienyl)(3-tert-butyl-5-methyl-2-phenoxy)titanium dichloride, isopropylidene(trimethylsilylcyclopentadienyl)(3-phenyl-2-phenoxy)titanium dichloride, isopropylidene(trimethylsilylcyclopentadienyl)(3-tert-butyldimethylsilyl-5-methyl-2-phenoxy)titanium dichloride, isopropylidene(trimethylsilylcyclopentadienyl)(3-trimethylsilyl-5-methyl-2-phenoxy)titanium dichloride, isopropylidene(trimethylsilylcyclopentadienyl)(3-tert-butyl-5-methoxy-2-phenoxy)titanium dichloride, isopropylidene(trimethylsilylcyclopentadienyl)(3-tert-butyl-5-chloro-2-phenoxy)titanium dichloride, isopropylidene(fluorenyl)(3,5-dimethyl-2-phenoxy)titanium dichloride, isopropylidene(fluorenyl)(3-tert-butyl-2-phenoxy)titanium dichloride, isopropylidene(fluorenyl)(3-tert-butyl-5-methyl-2-phenoxy)titanium dichloride, isopropylidene(fluorenyl)(3-phenyl-2-phenoxy)titanium dichloride, isopropylidene(fluorenyl)(3-tert-butyldimethylsilyl-5-methyl-2-phenoxy)titanium dichloride, isopropylidene(fluorenyl)(3-trimethylsilyl-5-methyl-2-phenoxy)titanium dichloride, isopropylidene(fluorenyl)(3-tert-butyl-5-methoxy-2-phenoxy)titanium dichloride, isopropylidene(fluorenyl)(3-tert-butyl-5-chloro-2-phenoxy)titanium dichloride, diphenylmethylene(cyclopentadienyl)(3,5-dimethyl-2-phenoxy)titanium dichloride, diphenylmethylene(cyclopentadienyl)(3-tert-butyl-2-phenoxy)titanium dichloride, diphenylmethylene(cyclopentadienyl)(3-tert-butyl-5-methyl-2-phenoxy)titanium dichloride, diphenylmethylene(cyclopentadienyl)(3-phenyl-2-phenoxy)titanium dichloride, diphenylmethylene(cyclopentadienyl)(3-tert-butyldimethylsilyl-5-methyl-2-phenoxy)titanium dichloride, diphenylmethylene(cyclopentadienyl)(3-trimethylsilyl-5-methyl-2-phenoxy)titanium dichloride, diphenylmethylene(cyclopentadienyl)(3-tert-butyl-5-methoxy-2-phenoxy)titanium dichloride, diphenylmethylene(cyclopentadienyl)(3-tert-butyl-5-chloro-2-phenoxy)titanium dichloride, diphenylmethylene (methylcyclopentadienyl)(3,5-dimethyl-2-phenoxy)titanium dichloride, diphenylmethylene(methylcyclopentadienyl)(3-tert-butyl-2-phenoxy)titanium dichloride, diphenylmethylene(methylcyclopentadienyl)(3-tert-butyl-5-methyl-2-phenoxy)titanium dichloride, diphenylmethylene(methylcyclopentadienyl)(3-phenyl-2-phenoxy)titanium dichloride, diphenylmethylene(methylcyclopentadienyl)(3-tert-butyldimethylsilyl-5-methyl-2-phenoxy)titanium dichloride, diphenylmethylene(methylcyclopentadienyl)(3-trimethylsilyl-5-methyl-2-phenoxy)titanium dichloride, diphenylmethylene(methylcyclopentadienyl)(3-tert-butyl-5-methoxy-2-phenoxy)titanium dichloride, diphenylmethylene(methylcyclopentadienyl)(3-tert-butyl-5-chloro-2-phenoxy)titanium dichloride, diphenylmethylene(tert-butylcyclopentadienyl)(3,5-dimethyl-2-phenoxy)titanium dichloride, diphenylmethylene(tert-butylcyclopentadienyl)(3-tert-butyl-2-phenoxy)titanium dichloride, diphenylmethylene(tert-butylcyclopentadienyl)(3-tert-butyl-5-methyl-2-phenoxy)titanium dichloride, diphenylmethylene(tert-butylcyclopentadienyl)(3-phenyl-2-phenoxy)titanium dichloride, diphenylmethylene(tert-butylcyclopentadienyl)(3-tert-butyldimethylsilyl-5-methyl-2-phenoxy)titanium dichloride, diphenylmethylene(tert-butylcyclopentadienyl)(3-trimethylsilyl-5-methyl-2-phenoxy)titanium dichloride, diphenylmethylene(tert-butylcyclopentadienyl)(3-tert-butyl-5-methoxy-2-phenoxy)titanium dichloride, diphenylmethylene(tert-butylcyclopentadienyl)(3-tert-butyl-5-chloro-2-phenoxy)titanium dichloride, diphenylmethylene(tetramethylcyclopentadienyl)(3,5-dimethyl-2-phenoxy)titanium dichloride, diphenylmethylene(tetramethylcyclopentadienyl)(3-tert-butyl-2-phenoxy)titanium dichloride, diphenylmethylene(tetramethylcyclopentadienyl)(3-tert-butyl-5-methyl-2-phenoxy)titanium dichloride, diphenylmethylene(tetramethylcyclopentadienyl)(3-phenyl-2-phenoxy)titanium dichloride, diphenylmethylene(tetramethylcyclopentadienyl)(3-tert-butyldimethylsilyl-5-methyl-2-phenoxy)titanium dichloride, diphenylmethylene(tetramethylcyclopentadienyl)(3-trimethylsilyl-5-methyl-2-phenoxy)titanium dichloride, diphenylmethylene(tetramethylcyclopentadienyl)(3-tert-butyl-5-methoxy-2-phenoxy)titanium dichloride, diphenylmethylene(tetramethylcyclopentadienyl)(3-tert-butyl-5-chloro-2-phenoxy)titanium dichloride, diphenylmethylene(trimethylsilylcyclopentadienyl)(3,5-dimethyl-2-phenoxy)titanium dichloride, diphenylmethylene(trimethylsilylcyclopentadienyl)(3-tert-butyl-2-phenoxy)titanium dichloride, diphenylmethylene(trimethylsilylcyclopentadienyl)(3-tert-butyl-5-methyl-2-phenoxy)titanium dichloride, diphenylmethylene(trimethylsilylcyclopentadienyl)(3-phenyl-2-phenoxy)titanium dichloride, diphenylmethylene(trimethylsilylcyclopentadienyl)(3-tert-butyldimethylsilyl-5-methyl-2-phenoxy)titanium dichloride, diphenylmethylene(trimethylsilylcyclopentadienyl)(3-trimethylsilyl-5-methyl-2-phenoxy)titanium dichloride, diphenylmethylene(trimethylsilylcyclopentadienyl)(3-tert-butyl-5-methoxy-2-phenoxy)titanium dichloride, diphenylmethylene(trimethylsilylcyclopentadienyl)(3-tert-butyl-5-chloro-2-phenoxy)titanium dichloride, diphenylmethylene(fluorenyl)(3,5-dimethyl-2-phenoxy)titanium dichloride, diphenylmethylene(fluorenyl)(3-tert-butyl-2-phenoxy)titanium dichloride, diphenylmethylene(fluorenyl)(3-tert-butyl-5-methyl-2-phenoxy)titanium dichloride, diphenylmethylene(fluorenyl)(3-phenyl-2-phenoxy)titanium dichloride, diphenylmethylene(fluorenyl)(3-tert-butyldimethylsilyl-5-methyl-2-phenoxy)titanium dichloride, diphenylmethylene(fluorenyl)(3-trimethylsilyl-5-methyl-2-phenoxy)titanium dichloride, diphenylmethylene(fluorenyl)(3-tert-butyl-5-methoxy-2-phenoxy)titanium dichloride, diphenylmethylene(fluorenyl)(3-tert-butyl-5-chloro-2-phenoxy)titanium dichloride, dimethylsilylene(cyclopentadienyl)(2-phenoxy)titanium dichloride, dimethylsilylene-(cyclopentadienyl)(3-methyl-2-phenoxy)titanium dichloride, dimethylsilylene(cyclopentadienyl)(3,5-dimethyl-2-phenoxy)titanium dichloride, dimethylsilylene(cyclopentadienyl)(3-tert-butyl-2-phenoxy)titanium dichloride, dimethylsilylene(cyclopentadienyl)(3-tert-butyl-5-methyl-2-phenoxy)titanium dichloride, dimethylsilylene(cyclopentadienyl)(3,5-di-tert-butyl-2-phenoxy)titanium dichloride, dimethylsilylene(cyclopentadienyl)(5-methyl-3-phenyl-2-phenoxy)titanium dichloride, dimethylsilylene(cyclopentadienyl)(3-tert-butyldimethylsilyl-5-methyl-2-phenoxy)titanium dichloride, dimethylsilylene(cyclopentadienyl)(5-methyl-3-trimethylsilyl-2-phenoxy)titanium dichloride, dimethylsilylene(cyclopentadienyl)(3-tert-butyl-5-methoxy-2-phenoxy)titanium dichloride, dimethylsilylene(cyclopentadienyl)(3-tert-butyl-5-chloro-2-phenoxy)titanium dichloride, dimethylsilylene(cyclopentadienyl)(3,5-diamyl-2-phenoxy) titanium dichloride, dimethylsilylene(methylcyclopentadienyl)(2-phenoxy)titanium dichloride, dimethylsilylene(methylcyclopentadienyl)(3-methyl-2-phenoxy)titanium dichloride, dimethylsilylene(methylcyclopentadienyl)(3,5-dimethyl-2-phenoxy)titanium dichloride, dimethylsilylene(methylcyclopentadienyl)(3-tert-butyl-2-phenoxy)titanium dichloride, dimethylsilylene(methylcyclopentadienyl)(3-tert-butyl-5-methyl-2-phenoxy)titanium dichloride, dimethylsilylene(methylcyclopentadienyl)(3,5-di-tert-butyl-2-phenoxy)titanium dichloride, dimethylsilylene(methylcyclopentadienyl)(5-methyl-3-phenyl-2-phenoxy)titanium dichloride, dimethylsilylene(methylcyclopentadienyl)(3-tert-butyldimethylsilyl-5-methyl-2-phenoxy)titanium dichloride, dimethylsilylene(methylcyclopentadienyl)(5-methyl-3-trimethylsilyl-2-phenoxy)titanium dichloride, dimethylsilylene(methylcyclopentadienyl)(3-tert-butyl-5-methoxy-2-phenoxy)titanium dichloride, dimethylsilylene(methylcyclopentadienyl)(3-tert-butyl-5-chloro-2-phenoxy)titanium dichloride, dimethylsilylene(methylcyclopentadienyl)(3,5-diamyl-2-phenoxy)titanium dichloride, dimethylsilylene(n-butylcyclopentadienyl)(2-phenoxy)titanium dichloride, dimethylsilylene(n-butylcyclopentadienyl)(3-methyl-2-phenoxy)titanium dichloride, dimethylsilylene(n-butylcyclopentadienyl)(3,5-dimethyl-2-phenoxy)titanium dichloride, dimethylsilylene(n-butylcyclopentadienyl)(3-tert-butyl-2-phenoxy)titanium dichloride, dimethylsilylene(n-butylcyclopentadienyl)(3-tert-butyl-5-methyl-2-phenoxy)titanium dichloride, dimethylsilylene(n-butylcyclopentadienyl)(3,5-di-tert-butyl-2-phenoxy)titanium dichloride, dimethylsilylene(n-butylcyclopentadienyl)(5-methyl-3-phenyl-2-phenoxy)titanium dichloride, dimethylsilylene(n-butylcyclopentadienyl)(3-tert-butyldimethylsilyl-5-methyl-2-phenoxy)titanium dichloride, dimethylsilylene(n-butylcyclopentadienyl)(5-methyl-3-trimethylsilyl-2-phenoxy)titanium dichloride, dimethylsilylene(n-butylcyclopentadienyl)(3-tert-butyl-5-methoxy-2-phenoxy)titanium dichloride, dimethylsilylene(n-butylcyclopentadienyl)(3-tert-butyl-5-chloro-2-phenoxy)titanium dichloride, dimethylsilylene(n-butylcyclopentadienyl)(3,5-diamyl-2-phenoxy)titanium dichloride, dimethylsilylene(tert-butylcyclopentadienyl)(2-phenoxy)titanium dichloride, dimethylsilylene(tert-butylcyclopentadienyl)(3-methyl-2-phenoxy)titanium dichloride, dimethylsilylene(tert-butylcyclopentadienyl)(3,5-dimethyl-2-phenoxy)titanium dichloride, dimethylsilylene(tert-butylcyclopentadienyl)(3-tert-butyl-2-phenoxy)titanium dichloride, dimethylsilylene(tert-butylcyclopentadienyl)(3-tert-butyl-5-methyl-2-phenoxy)titanium dichloride, dimethylsilylene(tert-butylcyclopentadienyl)(3,5-di-tert-butyl-2-phenoxy)titanium dichloride, dimethylsilylene(tert-butylcyclopentadienyl)(5-methyl-3-phenyl-2-phenoxy)titanium dichloride, dimethylsilylene(tert-butylcyclopentadienyl)(3-tert-butyldimethylsilyl-5-methyl-2-phenoxy)titanium dichloride, dimethylsilylene(tert-butylcyclopentadienyl)(5-methyl-3-trimethylsilyl-2-phenoxy)titanium dichloride, dimethylsilylene(tert-butylcyclopentadienyl)(3-tert-butyl-5-methoxy-2-phenoxy)titanium dichloride, dimethylsilylene(tert-butylcyclopentadienyl)(3-tert-butyl-5-chloro-2-phenoxy)titanium dichloride, dimethylsilylene(tert-butylcyclopentadienyl)(3,5-diamyl-2-phenoxy)titanium dichloride, dimethylsilylene(tetramethylcyclopentadienyl)(2-phenoxy) titanium dichloride, dimethylsilylene(tetramethylcyclopentadienyl)(3-methyl-2-phenoxy)titanium dichloride, dimethylsilylene(tetramethylcyclopentadienyl)(3,5-dimethyl-2-phenoxy)titanium dichloride, dimethylsilylene(tetramethylcyclopentadienyl)(3-tert-butyl-2-phenoxy)titanium dichloride, dimethylsilylene(tetramethylcyclopentadienyl)(3-tert-butyl-5-methyl-2-phenoxy)titanium dichloride, dimethylsilylene(tetramethylcyclopentadienyl)(3,5-di-tert-butyl- 2-phenoxy)titanium dichloride, dimethylsilylene(tetramethylcyclopentadienyl)(5-methyl-3-phenyl-2-phenoxy)titanium dichloride, dimethylsilylene(tetramethylcyclopentadienyl)(3-tert-butyldimethylsilyl-5-methyl-2-phenoxy)titanium dichloride, dimethylsilylene(tetramethylcyclopentadienyl)(5-methyl-3-trimethylsilyl-2-phenoxy)titanium dichloride, dimethylsilylene(tetramethylcyclopentadienyl)(3-tert-butyl-5-methoxy-2-phenoxy)titanium dichloride, dimethylsilylene(tetramethylcyclopentadienyl)(3-tert-butyl-5-chloro-2-phenoxy)titanium dichloride, dimethylsilylene(tetramethylcyclopentadienyl)(3,5-diamyl-2-phenoxy)titanium dichloride, dimethylsilylene(trimethylsilylcyclopentadienyl)(2-phenoxy)titanium dichloride, dimethylsilylene(trimethylsilylcyclopentadienyl)(3-methyl-2-phenoxy)titanium dichloride, dimethylsilylene(trimethylsilylcyclopentadienyl)(3,5-dimethyl-2-phenoxy)titanium dichloride, dimethylsilylene(trimethylsilylcyclopentadienyl)(3-tert-butyl-2-phenoxy)titanium dichloride, dimethylsilylene(trimethylsilylcyclopentadienyl)(3-tert-butyl-5-methyl-2-phenoxy)titanium dichloride, dimethylsilylene(trimethylsilylcyclopentadienyl)(3,5-di-tert-butyl-2-phenoxy)titanium dichloride, dimethylsilylene(trimethylsilylcyclopentadienyl)(5-methyl-3-phenyl-2-phenoxy)titanium dichloride, dimethylsilylene(trimethylsilylcyclopentadienyl)(3-tert-butyldimethylsilyl-5-methyl-2-phenoxy)titanium dichloride, dimethylsilylene(trimethylsilylcyclopentadienyl)(5-methyl-3-trimethylsilyl-2-phenoxy)titanium dichloride, dimethylsilylene(trimethylsilylcyclopentadienyl)(3-tert-butyl-5-methoxy-2-phenoxy)titanium dichloride, dimethylsilylene(trimethylsilylcyclopentadienyl)(3-tert-butyl-5-chloro-2-phenoxy)titanium dichloride, dimethylsilylene(trimethylsilylcyclopentadienyl)(3,5-diamyl-2-phenoxy)titanium dichloride, dimethylsilylene(indenyl)(2-phenoxy)titanium dichloride, dimethylsilylene(indenyl)(3-methyl-2-phenoxy)titanium dichloride, dimethylsilylene(indenyl)(3,5-dimethyl-2-phenoxy)titanium dichloride, dimethylsilylene(indenyl)(3-tert-butyl-2-phenoxy)titanium dichloride, dimethylsilylene(indenyl)(3-tert-butyl-5-methyl-2-phenoxy)titanium dichloride, dimethylsilylene(indenyl)(3,5-di-tert-butyl-2-phenoxy)titanium dichloride, dimethylsilylene(indenyl)(5-methyl-3-phenyl-2-phenoxy)titanium dichloride, dimethylsilylene(indenyl)(3-tert-butyldimethylsilyl-5-methyl-2-phenoxy)titanium dichloride, dimethylsilylene(indenyl)(5-methyl-3-trimethylsilyl-2-phenoxy)titanium dichloride, dimethylsilylene(indenyl)(3-tert-butyl-5-methoxy-2-phenoxy)titanium dichloride, dimethylsilylene(indenyl)(3-tert-butyl-5-chloro-2-phenoxy)titanium dichloride, dimethylsilylene(indenyl)(3,5-diamyl-2-phenoxy)titanium dichloride, dimethylsilylene(fluorenyl)(2-phenoxy)titanium dichloride, dimethylsilylene(fluorenyl)(3-methyl-2-phenoxy)titanium dichloride, dimethylsilylene(fluorenyl)(3,5-dimethyl-2-phenoxy)titanium dichloride, dimethylsilylene(fluorenyl)(3-tert-butyl-2-phenoxy)titanium dichloride, dimethylsilylene(fluorenyl)(3-tert-butyl-5-methyl-2-phenoxy)titanium dichloride, dimethylsilylene(fluorenyl)(3,5-di-tert-butyl-2-phenoxy)titanium dichloride, dimethylsilylene(fluorenyl)(5-methyl-3-phenyl-2-phenoxy)titanium dichloride, dimethylsilylene(fluorenyl)(3-tert-butyldimethylsilyl-5-methyl-2-phenoxy)titanium dichloride, dimethylsilylene(fluorenyl)(5-methyl-3-trimethylsilyl-2-phenoxy)titanium dichloride, dimethylsilylene(fluorenyl)(3-tert-butyl-5-methoxy-2-phenoxy)titanium dichloride, dimethylsilylene(fluorenyl)(3-tert-butyl-5-chloro-2-phenoxy)titanium dichloride, dimethylsilylene(fluorenyl)(3,5-diamyl-2-phenoxy)titanium dichloride, dimethylsilylene(tetramethylcyclopentadienyl)(1-naphthox-2-yl)titanium dichloride and the like, and compounds wherein (2-phenoxy) of these compounds is replaces with (3-phenyl-2-phenoxy), (3-trimethylsilyl-2-phenoxy) or (3-tert-butyldimethylsilyl-2-phenoxy), (tert-butylamido)tetramethylcyclopentadienyl-1,2-ethanediyltitanium dichloride, (tert-butylamido)tetramethylcyclopentadienyl-1,2-ethanediyltitanium dimethyl, (tert-butylamido)tetramethylcyclopentadienyl-1,2-ethanediyltitanium dibenzyl, (methylamido)tetramethylcyclopentadienyl-1,2-ethanediyltitanium dichloride, (ethylamido)tetramethylcyclopentadienyl-1,2-ethanediyltitanium dichloride, (tert-butylamido)tetramethylcyclopentadienyldimethylsilanetitanium dichloride, (tert-butylamido)tetramethylcyclopentadienyldimethylsilanetitanium dimethyl, (tert-butylamido)tetramethylcyclopentadienyldimethylsilane-titanium dibenzyl, (benzylamido)tetramethylcyclopentadienyl-dimethylsilanetitanium dichloride, (phenylphosphido)tetramethylcyclopentadienyldimethyl-silanetitanium dibenzyl, (tert-butylamido)indenyl-1,2-ethanediyltitanium dichloride, (tert-butylamido)indenyl-1,2-ethanediyltitanium dimethyl, (tert-butylamido)tetrahydroindenyl-1,2-ethanediyltitanium dichloride, (tert-butylamido)tetrahydroindenyl-1,2-ethanediyltitanium dimethyl, (tert-butylamido)fluorenyl-1,2-ethanediyltitanium dichloride, (tert-butylamido)fluorenyl-1,2-ethanediyltitanium dimethyl, (tert-butylamido)indenyldimethylsilanetitanium dichloride, (tert-butylamido)indenyldimethylsilanetitanium dimethyl, (tert-butylamido)tetrahydroindenyldimethylsilanetitanium dichloride, (tert-butylamido)tetrahydroindenyldimethylsilanetitanium dimethyl, (tert-butylamido)fluorenyldimethylsilanetitanium dichloride, (tert-butylamido) fluorenyldimethylsilanetitanium dimethyl, (dimethylaminomethyl)tetramethylcyclopentadienyl-titanium(III) dichloride, (dimethylaminomethyl)tetramethylcyclopentadienyl-titanium(III) dichloride, (dimethylaminopropyl)tetramethylcyclopentadienyl-titanium(III) dichloride, (N-pyrrolidinylethyl)tetramethylcyclopentadienyl-titanium dichloride, (B-dimethylaminoborabenzene)cyclopentadienylzirconium dichloride, cyclopentadienyl(9-mesitylboraanthracenyl)zirconium dichloride, 2,2'-thiobis(4-methyl-6-tert-buthylphenoxy)titanium dichloride, 2,2'-thiobis[4-methyl-6-(1-methylethyl)phenoxy]titanium dichloride, 2,2'-thiobis[4,6-dimethylphenoxy]titanium dichloride, 2,2'-thiobis(4-methyl-6-tert-butylphenoxy)titanium dichloride, 2,2'-methylenebis(4-methyl-6-tert-butylphenoxy)titanium dichloride, 2,2'-ethylenebis(4-methyl-6-tert-butylphenoxy) titanium dichloride, 2,2'-sulfinylbis(4-methyl-6-tert-butylphenoxy)titanium dichloride, 2,2'-(4,4',6,6'-tetra-tert-butyl-1,1'-biphenoxy)titanium dichloride, 2,2'-thiobis[4-methyl-6-tert-butylphenoxy]titanium diisopropoxide, 2,2'-methylenebis(4-methyl-6-tert-butylphenoxy)titanium diisopropoxide, 2,2'-ethylenebis(4-methyl-6-tert-butylphenoxy)titanium diisopropoxide, 2,2'-sulfinylbis(4-methyl-6-tert-butylphenoxy)titanium diisopropoxide, (di-tert-butyl-1,3-propanediamido)titanium dichloride, (dicyclohexyl-1,3-propanediamido)titanium dichloride, [bis(trimethylsilyl)-1,3-propanediamido]titanium dichloride, [bis(tert-butyldimethylsilyl)-1,3-propanediamido]titanium dichloride, [bis(2,6-dimethylphenyl)-1,3-propanediamido] titanium dichloride, [bis(2,6-diisopropylphenyl)-1,3-propanediamido]titanium dichloride, [bis(2,6-di-tert-butylphenyl)-1,3-propanediamido]titanium dichloride, [bis(triisopropylsilyl)naphthalenediamido]titanium dichloride, [bis(trimethylsilyl)naphthalenediamido]titanium dichloride, [bis(tert-butyldimethylsilyl)naphthalenediamido]titanium dichloride, [bis(tert-butyldimethylsilyl)naphthalenediamido]titanium dibromide, [hydrotris(3,5-dimethylpyrazolyl)borate]titanium trichloride, [hydrotris(3,5-dimethylpyrazolyl)borate]titanium tribromide, [hydrotris(3,5-dimethylpyrazolyl)borate]titanium triiodide, [hydrotris(3,5-diethylpyrazolyl)borate]titanium trichloride, [hydrotris(3,5-diethylpyrazolyl)borate]titanium tribromide, [hydrotris(3,5-diethylpyrazolyl)borate]titanium triiodide, [hydrotris(3,5-di-tert-butylpyrazolyl)borate]titanium trichloride, [hydrotris(3,5-di-tert-butylpyrazolyl)borate]titanium tribromide, [hydrotris(3,5-di-tert-butylpyrazolyl)borate]titanium triiodide, [tris(3,5-dimethylpyrazolyl)methyl]titanium trichloride, [tris(3,5-dimethylpyrazolyl)methyl]titanium tribromide, [tris(3,5-dimethylpyrazolyl)methyl]titanium triiodide, [tris(3,5-diethylpyrazolyl)methyl]titanium trichloride, [tris(3,5-diethylpyrazolyl)methyl]titanium tribromide, [tris(3,5-diethylpyrazolyl)methyl]titanium triiodide, [tris(3,5-di-tert-butylpyrazolyl)methyl]titanium trichloride, [tris(3,5-di-tert-butylpyrazolyl)methyl]titanium tribromide, [tris(3,5-di-tert-butylpyrazolyl)methyl]titanium triiodide; compounds in which titanium of these compounds is replaced with zirconium or hafnium: compounds wherein (2-phenoxy) of these compounds is replaced by (3-phenyl-2-phenoxy), (3-trimethylsilyl-2-phenoxy) or (3-tert-butyldimethylsilyl-2-phenoxy); compounds wherein dimethylsilylene of these compounds is replaced by diethylsilylene, diphenylsilylene or dimethoxysilylene; and compounds wherein chloride of these compounds is replaced with fluoride, bromide, iodide, methyl, ethyl, isopropyl, phenyl, benzyl, methoxide, n-propoxide, isopropoxide, n-butoxide, trifluoromethoxide, phenoxide, 2,6-di-tert-butylphenoxide, 3,4,5-trifluorophenoxide, pentafluorophenoxide, or 2,3,5,6-tetrafluoro-4-pentafluorophenylphenoxide; and the like.

Among the transition metal compounds, specific examples of a compound in which a transition metal atom is a nickel atom include 2,2'-methylenebis[(4R)-4-phenyl-5,5'-dimethyloxazoline]nickel dichloride, 2,2'-methylenebis[(4R)-4-phenyl-5,5'-dimethyloxazoline]nickel dibromide, 2,2'-methylenebis[(4R)-4-phenyl-5,5'-diethyloxazoline] nickel dichloride, 2,2'-methylenebis[(4R)-4-phenyl-5,5'-diethyloxazoline]nickel dibromide, 2,2'-methylenebis[(4R)-4-phenyl-5,5'-di-n-propyloxazoline]nickel dichloride, 2,2'-methylenebis[(4R)-4-phenyl-5,5'-di-n-propyloxazoline] nickel dibromide, 2,2'-methylenebis[(4R)-4-phenyl-5,5'-diisopropyloxazoline]nickel dichloride, 2,2'-methylenebis [(4R)-4-phenyl-5,5'-diisopropyloxazoline]nickel dibromide, 2,2'-methylenebis[(4R)-4-phenyl-5,5'-dicyclohexyloxazoline]nickel dichloride, 2,2'-methylenebis[(4R)-4-phenyl-5,5'-dicyclohexyloxazoline]nickel dibromide, 2,2'-methylenebis[(4R)-4-phenyl-5,5'-dimethoxyoxazoline]nickel dichloride, 2,2'-methylenebis[(4R)-4-phenyl-5,5'-dimethoxyoxazoline]nickel dibromide, 2,2'-methylenebis [(4R)-4-phenyl-5,5'-diethoxyoxazoline]nickel dichloride, 2,2'-methylenebis[(4R)-4-phenyl-5,5'-diethoxyoxazoline] nickel dibromide, 2,2'-methylenebis[(4R)-4-phenyl-5,5'-diphenyloxazoline]nickel dichloride, 2,2'-methylenebis [(4R)-4-phenyl-5,5'-diphenyloxazoline]nickel dibromide, methylenebis[(4R)-4-methyl-5,5'-di-(2-methylphenyl)oxazoline] nickel dibromide, methylenebis[(4R)-4-methyl-5,5'-di-(3-methylphenyl)oxazoline]nickel dibromide, methylenebis[(4R)-4-methyl-5,5'-di-(4-methylphenyl)oxazoline] nickel dibromide, methylenebis[(4R)-4-methyl-5,5'-di-(2-methoxyphenyl)oxazoline]nickel dibromide, methylenebis [(4R)-4-methyl-5,5'-di-(3-methoxyphenyl)oxazoline]nickel dibromide, methylenebis[(4R)-4-methyl-5,5'-di-(4-methoxyphenyl)oxazoline]nickel dibromide, methylenebis[spiro{ (4R)-4-methyloxazoline-5,1'-cyclobutane}]nickel dibromide, methylenebis[spiro{(4R)-4-methyloxazoline-5,1'-cyclopentane}]nickel dibromide, methylenebis[spiro{(4R)-4-methyloxazoline-5,1'-cyclohexane}]nickel dibromide, methylenebis[spiro{(4R)-4-methyloxazoline-5,1'-cycloheptane}]nickel dibromide, 2,2'-methylenebis[(4R)-4-isopropyl-5,5-dimethyloxazoline]nickel dibromide, 2,2'-methylenebis[(4R)-4-isopropyl-5,5-diethyloxazoline]nickel dibromide, 2,2'-methylenebis[(4R)-4-isopropyl-5,5-di-n-propyloxazoline]nickel dibromide, methylenebis[(4R)-4-isopropyl-5,5-diisopropyloxazoline]nickel dibromide, 2,2'-methylenebis[(4R)-4-isopropyl-5,5-dicyclohexyloxazoline] nickel dibromide, 2,2'-methylenebis[(4R)-4-isopropyl-5,5-diphenyloxazoline]nickel dibromide, 2,2'-methylenebis [(4R)-4-isopropyl-5,5-di-(2-methylphenyl)oxazoline]nickel dibromide, 2,2'-methylenebis[(4R)-4-isopropyl-5,5-di-(3-methylphenyl)oxazoline]nickel dibromide, 2,2'-methylenebis[(4R)-4-isopropyl-5,5-di-(4-methylphenyl)oxazoline] nickel dibromide, 2,2'-methylenebis[(4R)-4-isopropyl-5,5-di-(2-methoxyphenyl)oxazoline]nickel dibromide, 2,2'-methylenebis[(4R)-4-isopropyl-5,5-di-(3-methoxyphenyl) oxazoline]nickel dibromide, 2,2'-methylenebis[(4R)-4-isopropyl-5,5-di-(4-methoxyphenyl)oxazoline]nickel dibromide, 2,2'-methylenebis[spiro{(4R)-4-isopropyloxazoline-5,1'-cyclobutane}]nickel dibromide, 2,2'-methylenebis [spiro{(4R)-4-isopropyloxazoline-5,1'-cyclopentane}] nickel dibromide, 2,2'-methylenebis[spiro{(4R)-4-isopropyloxazoline-5,1'-cyclohexane}]nickel dibromide, 2,2'-methylenebis[spiro{(4R)-4-isopropyloxazoline-5,1'-cycloheptane}]nickel dibromide, 2,2'-methylenebis[(4R)-4-isobutyl-5,5-dimethyloxazoline]nickel dibromide, 2,2'-methylenebis[(4R)-4-isobutyl-5,5-diethyloxazoline]nickel dibromide, 2,2'-methylenebis[(4R)-4-isobutyl-5,5-di-n-propyloxazoline]nickel dibromide, 2,2'-methylenebis[(4R)-4-isobutyl-5,5-diisopropyloxazoline] nickel dibromide, 2,2'-methylenebis[(4R)-4-isobutyl-5,5-dicyclohexyloxazoline] nickel dibromide, 2,2'-methylenebis[(4R)-4-isobutyl-5,5-diphenyloxazoline]nickel dibromide, 2,2'-methylenebis [(4R)-4-isobutyl-5,5-di-(2-methylphenyl)oxazoline]nickel dibromide, 2,2'-methylenebis[(4R)-4-isobutyl-5,5-di-(3-methylphenyl)oxazoline]nickel dibromide, 2,2'-methylenebis[(4R)-4-isobutyl-5,5-di-(4-methylphenyl)oxazoline]nickel dibromide, 2,2'-methylenebis[(4R)-4-isobutyl-5,5-di-(2-methoxyphenyl)oxazoline]nickel dibromide, 2,2'-methylenebis[(4R)-4-isobutyl-5,5-di-(3-methoxyphenyl)oxazoline]nickel dibromide, 2,2'-methylenebis[(4R)-4-isobutyl-5,5-di-(4-methoxyphenyl)oxazoline]nickel dibromide, 2,2'-methylenebis[spiro{(4R)-4-isobutyloxazoline-5,1'-cyclobutane}]nickel dibromide, 2,2'-methylenebis[spiro{(4R)-4-isobutyloxazoline-5,1'-cyclopentane}]nickel dibromide, 2,2'-methylenebis[spiro{(4R)-4-isobutyloxazoline-5,1'-cyclohexane}]nickel dibromide, 2,2'-methylenebis[spiro{(4R)-4-isobutyloxazoline-5,1'-cycloheptane}]nickel dibromide, 2,2'-methylenebis[(4R)-4-tert-butyl-5,5-dimethyloxazoline]nickel dibromide, 2,2'-methylenebis[(4R)-4-tert-butyl-5,5-diethyloxazoline]nickel dibromide, 2,2'-methylenebis[(4R)-4-tert-butyl-5,5-di-n-propyloxazoline]nickel dibromide, 2,2'-methylenebis[(4R)-4-tert-butyl-5,5-diisopropyloxazoline]nickel dibromide, 2,2'-methylenebis[(4R)-4-tert-butyl-5,5-diphenyloxazoline]nickel dibromide, 2,2'-methylenebis[(4R)-4-tert-butyl-5,5-dicyclohexyloxazoline]nickel dibromide, 2,2'-methylenebis[(4R)-4-tert-butyl-5,5-di-(2-methylphenyl)oxazoline]nickel dibromide, 2,2'-methylenebis[(4R)-4-tert-butyl-5,5-di-(3-methylphenyl)oxazoline]nickel dibromide, 2,2'-methylenebis[(4R)-4-tert-butyl-5,5-di-(4-methylphenyl)oxazoline]nickel dibromide, 2,2'-methylenebis[(4R)-4-tert-butyl-5,5-di-(2-methoxyphenyl)oxazoline]nickel dibromide, 2,2'-methylenebis[(4R)-4-tert-butyl-5,5-di-(3-methoxyphenyl)oxazoline]nickel dibromide, 2,2'-methylenebis[(4R)-4-tert-butyl-5,5-di-(4-methoxyphenyl)oxazoline]nickel dibromide, 2,2'-methylenebis[spiro{(4R)-4-tert-butyloxazoline-5,1'-cyclobutane}]nickel dibromide, 2,2'-methylenebis[spiro{(4R)-4-tert-butyloxazoline-5,1'-cyclopentane}]nickel dibromide, 2,2'-methylenebis[spiro{(4R)-4-tert-butyloxazoline-5,1'-cyclohexane}]nickel dibromide, 2,2'-methylenebis[spiro{(4R)-4-tert-butyloxazoline-5,1'-cycloheptane}] nickel dibromide, 2,2'-methylenebis[(4R)-4-phenyl-5,5-dimethyloxazoline] nickel dibromide, 2,2'-methylenebis[(4R)-4-phenyl-5,5-diethyloxazoline]nickel dibromide, 2,2'-methylenebis[(4R)-4-phenyl-5,5-di-n-propyloxazoline] nickel dibromide, 2,2'-methylenebis[(4R)-4-phenyl-5,5-diisopropyloxazoline]nickel dibromide, 2,2'-methylenebis[(4R)-4-phenyl-5,5-dicyclohexyloxazoline]nickel dibromide 2,2'-methylenebis[(4R)-4-phenyl-5,5-diphenyl)oxazoline]nickel dibromide, 2,2'-methylenebis[(4R)-4-phenyl-5,5-di-(2-methylphenyl)oxazoline]nickel dibromide, 2,2'-methylenebis[(4R)-4-phenyl-5,5-di-(3-methylphenyl)oxazoline]nickel dibromide, 2,2'-methylenebis[(4R)-4-phenyl-5,5-di-(4-methylphenyl)oxazoline]nickel dibromide, 2,2'-methylenebis[(4R)-4-phenyl-5,5-di-(2-methoxyphenyl)oxazoline]nickel dibromide, 2,2'-methylenebis[(4R)-4-phenyl-5,5-di-(3-methoxyphenyl)oxazoline]nickel dibromide, 2,2'-methylenebis[(4R)-4-phenyl-5,5-di-(4-methoxyphenyl)oxazoline]nickel dibromide, methylenebis[spiro{(4R)-4-phenyloxazoline-5,1'-cyclobutane}]nickel dibromide, 2,2'-methylenebis[spiro{(4R)-4-phenyloxazoline-5,1'-cyclopentane}]nickel dibromide, 2,2'-methylenebis[spiro{(4R)-4-phenyloxazoline-5,1'-cyclohexane}]nickel dibromide, 2,2'-methylenebis[spiro{(4R)-4-phenyloxazoline-5,1'-cycloheptane}]nickel dibromide, 2,2'-methylenebis[(4R)-4-benzyl-5,5-dimethyloxazoline]nickel dibromide, 2,2'-methylenebis[(4R)-4-benzyl-5,5-diethyloxazoline]nickel dibromide, 2,2'-methylenebis[(4R)-4-benzyl-5,5-di-n-propyloxazoline]nickel dibromide, 2,2'-methylenebis[(4R)-4-benzyl-5,5-diisopropyloxazoline]nickel dibromide, 2,2'-methylenebis[(4R)-4-benzyl-5,5-dicyclohexyloxazoline]nickel dibromide, 2,2'-methylenebis[(4R)-4-benzyl-5,5-diphenyl)oxazoline]nickel dibromide, 2,2'-methylenebis[(4R)-4-benzyl-5,5-di-(2-methylphenyl)oxazoline]nickel dibromide, 2,2'-methylenebis[(4R)-4-benzyl-5,5-di-(3-methylphenyl)oxazoline]nickel dibromide, 2,2'-methylenebis[(4R)-4-benzyl-5,5-di-(4-methylphenyl)oxazoline]nickel dibromide, 2,2'-methylenebis[(4R)-4-benzyl-5,5-di-(2-methoxyphenyl)oxazoline]nickel dibromide, 2,2'-methylenebis[(4R)-4-benzyl-5,5-di-(3-methoxyphenyl)oxazoline] nickel dibromide, 2,2'-methylenebis[(4R)-4-benzyl-5,5-di-(4-methoxyphenyl)oxazoline]nickel dibromide, 2,2'-methylenebis[spiro{(4R)-4-benzyloxazoline-5,1'-cyclobutane}]nickel dibromide, 2,2'-methylenebis[spiro{(4R)-4-benzyloxazoline-5,1'-cyclopentane}] nickel dibromide, 2,2'-methylenebis[spiro{(4R)-4-benzyloxazoline-5,1'-cyclohexane}]nickel dibromide, 2,2'-methylenebis[spiro{(4R)-4-benzyloxazoline-5,1'-cycloheptane}]nickel dibromide, and compounds in which (4R) in each of the above-mentioned compounds corresponds to (4S), etc. Further, examples of the meso type isomer include compounds in which (4R) of two skeletons in each of the compounds which are mentioned above as the optically active substances of bisoxazolines were changed to (4R) of one oxazoline skeleton and (4S) of another oxazoline skeleton.

Moreover, compounds in which dibromide in these compounds is replaced with dichloride, dimethyl, diethyl, diisopropyl, diphenyl, dibenzyl, dimethoxide, diethoxide, di(n-propoxide), di(isopropoxide), di(n-butoxide), di(trifluoromethoxide), diphenoxide, di(2,6-di-tert-butylphenoxide), di(3,4,5-trifluorophenoxide), di(pentafluorophenoxide), or di(2,3,5,6-tetrafluoro-4-pentafluorophenylphenoxide).

Furthermore, specific examples of the nickel compound include [hydrotris(3,5-dimethylpyrazolyl)borate]nickel chloride, [hydrotris(3,5-dimethylpyrazolyl)borate]nickel bromide, [hydrotris(3,5-dimethylpyrazolyl)borate]nickel iodide, [hydrotris(3,5-dimethylpyrazolyl)borate]nickel methyl, [hydrotris(3,5-dimethylpyrazolyl)borate]nickel ethyl, [hydrotris(3,5-dimethylpyrazolyl)borate]nickel allyl, [hydrotris(3,5-dimethylpyrazolyl)borate]nickel methallyl, [hydrotris(3,5-diethylpyrazolyl)borate]nickel chloride, [hydrotris(3,5-diethylpyrazolyl)borate]nickel bromide, [hydrotris(3,5-diethylpyrazolyl)borate]nickel iodide, [hydrotris(3,5-diethylpyrazolyl)borate]nickel methyl, [hydrotris(3,5-diethylpyrazolyl)borate]nickel ethyl, [hydrotris(3,5-diethylpyrazolyl)borate]nickel allyl, [hydrotris(3,5-diethylpyrazolyl)borate]nickel methallyl, [hydrotris(3,5-di-tert-butylpyrazolyl)borate]nickel chloride, [hydrotris(3,5-di-tert-butylpyrazolyl)borate]nickel bromide, [hydrotris(3,5-di-tert-butylpyrazolyl)borate]nickel iodide, [hydrotris(3,5-di-tert-butylpyrazolyl)borate]nickel methyl, [hydrotris(3,5-di-tert-butylpyrazolyl)borate]nickel ethyl, [hydrotris(3,5-di-tert-butylpyrazolyl)borate]nickel allyl, [hydrotris(3,5-di-tert-butylpyrazolyl)borate]nickel methallyl, compounds indicated by the structural formula described below:

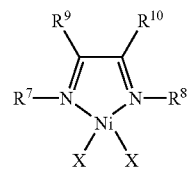

(wherein each of $R^7$ and $R^8$ is a 2,6-diisopropylphenyl group, and X, $R^9$ and $R^{10}$ are any one of the combination of the substituents represented in Table 1 described below.)

TABLE 1

| | | |
|---|---|---|
| $R^9 = R^{10}$ = H<br>X = F | $R^9 = R^{10}$ = methyl<br>X = F | Acenaphthyl by $R^9$ & $R^{10}$<br>X = F |
| $R^9 = R^{10}$ = H<br>X = Cl | $R^9 = R^{10}$ = methyl<br>X = Cl | Acenaphthyl by $R^9$ & $R^{10}$<br>X = Cl |
| $R^9 = R^{10}$ = H<br>X = I | $R^9 = R^{10}$ = methyl<br>X = I | Acenaphthyl by $R^9$ & $R^{10}$<br>X = I |
| $R^9 = R^{10}$ = H<br>X = Methyl | $R^9 = R^{10}$ = methyl<br>X = Methyl | Acenaphthyl by $R^9$ & $R^{10}$<br>X = Methyl |
| $R^9 = R^{10}$ = H<br>X = Ethyl | $R^9 = R^{10}$ = methyl<br>X = Ethyl | Acenaphthyl by $R^9$ & $R^{10}$<br>X = Ethyl |
| $R^9 = R^{10}$ = H<br>X = n-propyl | $R^9 = R^{10}$ = methyl<br>X = n-propyl | Acenaphthyl by $R^9$ & $R^{10}$<br>X = n-propyl |
| $R^9 = R^{10}$ = H<br>X = isopropyl | $R^9 = R^{10}$ = methyl<br>X = isopropyl | Acenaphthyl by $R^9$ & $R^{10}$<br>X = isopropyl |
| $R^9 = R^{10}$ = H<br>X = n-butyal | $R^9 = R^{10}$ = methyl<br>X = n-butyal | Acenaphthyl by $R^9$ & $R^{10}$<br>X = n-butyal |
| $R^9 = R^{10}$ = H<br>X = phenyl | $R^9 = R^{10}$ = methyl<br>X = phenyl | Acenaphthyl by $R^9$ & $R^{10}$<br>X = phenyl |
| $R^9 = R^{10}$ = H<br>X = benzyl | $R^9 = R^{10}$ = methyl<br>X = benzyl | Acenaphthyl by $R^9$ & $R^{10}$<br>X = benzyl |

Further, compounds wherein a nickel atom is replaced with a palladium atom, a cobalt atom, a rhodium atom or a ruthenium atom can be similarly exemplified in the above-mentioned nickel compounds.

Among the transition metal compounds, specific examples of a compound in which a transition metal atom is an iron atom include 2,6-bis-[1-(2,6-dimethylphenylimino)ethyl]pyridineiron dichloride, 2,6-bis-[1-(2,6-diisopropylphenylimino)ethyl]pyridineiron dichloride, 2,6-bis-[1-(2-tert-butylphenylimino)ethyl]pyridineiron dichloride, [hydrotris(3,5-dimethylpyrazolyl)borate]iron chloride, [hydrotris(3,5-dimethylpyrazolyl)borate]iron bromide, [hydrotris(3,5-dimethylpyrazolyl)borate]iron iodide, [hydrotris(3,5-dimethylpyrazolyl)borate]iron methyl, [hydrotris(3,5-dimethylpyrazolyl)borate]iron ethyl, [hydrotris(3,5-dimethylpyrazolyl)borate]iron allyl, [hydrotris(3,5-dimethylpyrazolyl)borate]iron methallyl, [hydrotris(3,5-diethylpyrazolyl)borate]iron chloride, [hydrotris(3,5-diethylpyrazolyl)borate]iron bromide, [hydrotris(3,5-diethylpyrazolyl)borate]iron iodide, [hydrotris(3,5-diethylpyrazolyl)borate]iron methyl, [hydrotris(3,5-diethylpyrazolyl)borate]iron ethyl, [hydrotris(3,5-diethylpyrazolyl)borate]iron allyl, [hydrotris(3,5-diethylpyrazolyl)borate]iron methallyl, [hydrotris(3,5-di-tert-butylpyrazolyl)borate]iron chloride, [hydrotris(3,5-di-tert-butylpyrazolyl)borate]iron bromide, [hydrotris(3,5-di-tert-butylpyrazolyl)borate]iron iodide, [hydrotris(3,5-di-tert-butylpyrazolyl)borate]iron methyl, [hydrotris(3,5-di-tert-butylpyrazolyl)borate]iron ethyl, [hydrotris(3,5-di-tert-butylpyrazolyl)borate]iron allyl, [hydrotris(3,5-di-tert-butylpyrazolyl)borate]iron methallyl, and the like.

Further, compounds wherein an iron atom is replaced with a cobalt atom or a nickel atom can be similarly exemplified in the above-mentioned iron compounds.

Specific examples of the μ-oxo type transition metal compound obtained by reacting the transition metal compound represented by the general formula [4] with water as a dimer thereof, include a μ-oxobis{isopropylidene(cyclopentadienyl)(2-phenoxy)titanium chloride}, μ-oxobis{isopropylidene(cyclopentadienyl)(3-tert-butyl-5-methyl-2-phenoxy)titanium chloride}, μ-oxobis{isopropylidene(methylcyclopentadienyl)(2-phenoxy)titanium chloride}, μ-oxobis{isopropylidene(methylcyclopentadienyl)(3-tert-butyl-5-methyl-2-phenoxy)titanium chloride}, μ-oxobis{isopropylidene(tetramethylcyclopentadienyl)(2-phenoxy)titanium chloride}, μ-oxobis{isopropylidene(tetramethylcyclopentadienyl)(3-tert-butyl-5-methyl-2-phenoxy)titanium chloride}, μ-oxobis{dimethylsilylene(cyclopentadienyl)(2-phenoxy)titanium chloride}, μ-oxobis{dimethylsilylene(cyclopentadienyl)(3-tert-butyl-5-methyl-2-phenoxy)titanium chloride}, μ-oxobis{dimethylsilylene(methylcyclopentadienyl)(2-phenoxy)titanium chloride}, μ-oxobis{dimethylsilylene(methylcyclopentadienyl)(3-tert-butyl-5-methyl-2-phenoxy)titanium chloride}, μ-oxobis{dimethylsilylene (tetramethylcyclopentadienyl)(2-phenoxy)titanium chloride}, μ-oxobis{dimethylsilylene (tetramethylcyclopentadienyl)(3 -tert-butyl-5-methyl-2-phenoxy)titanium chloride} and the like.

Further, compounds in which cloride in those compounds is replaced with fluoride, bromide, iodide, methl, ethyl, isopropyl, phenyl, benzyl, methoxide, ethoxide, n-propoxide, isopropoxide, n-butoxide, trifluoromethoxide, phenoxide, 2,6-di-tert-butylphenoxide, 3,4,5-trifluorophenoxide, pentafluorophenoxide or 2,3,5,6-tetrafluoro-4-pentafluorophenoxide and the like can be exemplified.

Furthermore, compounds in which a titanium atom is replaced with a zirconium atom or a hafnium atom can be similarly exemplified in the above-mentioned titanium compounds.

Specific examples of the metal compounds (B) as a compound in which metal atom is nickel atom, other than the metal compounds represented by the general formula [4] and μ-oxo type metal compounds include nickel chloride, nickel bromide, nickel iodide, nickel sulfate, nickel nitrate, nickel perchlorate, nickel acetate, nickel trifluoroacetate, nickel cyanide, nickel oxalate, nickel acetylacetonate, bis(allyl) nickel, bis(1,5-cyclooctadiene)nickel, dichloro(1,5-cyclooctadiene)nickel, dichlorobis(acetonitrile)nickel, dichlorobis(benzonitrile)nickel, carbonyl tris(triphenylphosphine)nickel, dichlorobis(triethylphosphine)nickel, di-acetobis(triphenylphosphine)nickel, tetrakis(triphenylphosphine)nickel, dichloro[1,2-bis (diphenylphosphino)ethane]nickel, bis[1,2-bis(diphenylphosphino)ethane]nickel, dichloro[1,3-bis(diphenylphosphino)propane]nickel, bis[1,3-bis(diphenylphosphino)propane]nickel, tetraamine nickel nitrate, tetrakis(acetonitrile)nickel tetrafluoroborate, nickel phthalocyanine, etc.

Among the metal compounds (B), specific examples of a compound in which a transition metal atom is a vanadium atom include vanadium acetylacetonate, vanadium tetrachloride, vanadium oxy trichloride and the like.

Among the metal compounds (B), specific examples of a compound in which a transition metal atom is a samarium atom include bis(pentamethylcyclopentadienyl)samarium methyltetrahydrofuran and the like.

Among the metal compounds (B), specific examples of a compound in which a transition metal atom is an ytterbium atom include bis(pentamethylcyclopentadienyl)ytterbium methyltetrahydrofuran and the like.

These metal compounds (B) may be used alone, or in combination of 2 or more kinds of the compounds.

In the metal compounds described above, as a transition metal compound used in the present invention, compounds represented by the general formula [4] are preferable.

Among these, metal compounds in which $M^2$ is a transition metal of the IV group in the general formula [4] are preferable, and further, particularly transition metal compounds in which $L^2$ in the general formula [4] is a group having at least one cyclopentadiene type anion skeleton, are preferable.

(C) Aluminum Compound

The aluminum compound (C) used in the present invention includes at least one aluminum compound selected from (C1) to (C3) described below:

(C1) an organoaluminum compound represented by the general formula $E^1{}_aAlZ_{3-a}$;
(C2) a cyclic aluminoxane having a structure represented by the general formula $\{-Al(E^2)-O-\}_b$; and
(C3) a linear aluminoxane having a structure represented by the general formula $E^3\{-Al(E^3)-O-\}_cAlE^3{}_2$ (wherein $E^1$, $E^2$ and $E^3$ respectively represent a hydrocarbon group, all of $E^1$, all of $E^2$ and all of $E^3$ may be the same or different; Z represents a hydrogen atom or a halogen atom, and all of Z may be the same or different; a represents a number satisfying the expression $0<c\leqq3$; b represents an integer of 2 or more; and c represents an integer of 1 or more).

As the hydrocarbon group in $E^1$, $E^2$ or $E^3$, a hydrocarbon group having 1 to 8 carbon atoms is preferred and an alkyl group is more preferred.

Specific examples of the organoaluminum compound (C1) represented by $E^1{}_aAlZ_{3-a}$ include trialkylaluminums such as trimethylaluminum, triethylaluminum, tri-n-propylaluminum, triisopropylaluminum, triisobutylaluminum, tri-n-hexylaluminum, tri-n-octylaluminum, etc.; dialkylaluminum chlorides such as dimethylaluminum chloride, diethylaluminum chloride, di-n-propylaluminum chloride, diisopropylaluminum chloride, diisobutylaluminum chloride, di-n-hexylaluminum chloride, etc.; alkylaluminum dichlorides such as methylaluminum dichloride, ethylaluminum dichloride, n-propylaluminum dichloride, isopropylaluminum dichloride, isobutylaluminum dichloride, n-hexylaluminum dichloride, etc.; and dialkylaluminum hydrides such as dimethylaluminum hydride, diethylaluminum hydride, di-n-propylaluminum hydride, diisobutylaluminum hydride, di-n-hexylaluminum hydride, etc.

Among them, trialkylaluminums are preferred and triisobutylaluminum or tri-n-octylaluminum, is more preferred.

Specific examples of $E^2$ and $E^3$ in (C2) a cyclic aluminoxane having a structure represented by the general formula $\{-Al(E^2)-O-\}_b$ and (C3) a linear aluminoxane having a structure represented by the general formula $E_3\{-Al(E^3)-O-\}_cAlE^3{}_2$ include an alkyl group such as methyl group, ethyl group, n-propyl group, isopropyl group, n-butyl group, isobutyl group, n-pentyl group, neopentyl group, etc. b is an integer of 2 or more, c is an integer of 1 or more. Each of $E^2$ and $E^3$ is preferably a methyl group or isobutyl group. b is preferably from 2 to 40 and c is preferably from 1 to 40.

The above aluminoxane is prepared by various methods. The method is not specifically limited, and the aluminoxane may be prepared according to a publicly known method. For example, the aluminoxane is prepared by contacting a solution obtained by dissolving a trialkylaluminum (e.g. trimethylaluminum) in a suitable organic solvent (e.g. benzene, toluene, aliphatic hydrocarbon) with water. Also, there can be illustrated a method for preparing the aluminoxane by contacting a trialkylaluminum (e.g. trimethylaluminum, etc.) with a metal salt containing crystal water (e.g. copper sulfate hydrate, etc.). It is assumed that the aluminoxane prepared by such methods is a mixture of a cyclic aluminoxane and linear aluminoxane.

The amount of the component (B) used is normally from $1\times10^{-6}$ to $1\times10^{-3}$ mol, and preferably from $5\times10^{-6}$ to $5\times10^{-4}$ mol, per 1 g of the component A). And, the amount of the organoaluminum compound used as the component (C) is preferably from 0.01 to 10,000, more preferably from 0.1 to 5,000, and most preferably from 1 to 2,000 in terms of molar ratio of the metal atom of the organoaluminum compound as the compound(c) to the transition metal atom of the transition metal compound as the component (B), i.e. (C)/(B).

In the present invention, the component A) and component (B) and optionally component (C) can be charged in a reactor in an arbitrary order at the time of polymerization. When the components (A), (B) and (C) are used, arbitrary two components of them may be previously contacted each other followed by contacting the remainder component.

A method for supplying respective catalyst components or a catalyst prepared to a reactor is not particularly limited. There can be exemplified a method of supplying respective components as they are or in a solution, suspension or slurry state in which they are dissolved, suspended or slurryed in a hydrocarbon solvent in which components (e.g., moisture, oxygen) de-activating the catalyst components are sufficiently eliminated.

When the respective components are supplied in the form of solution, suspension or slurry, the concentrations of the component (A) is usually 0.01 to 1000 g/L, preferably 0.1 to 500 g/L. The concentration of the component (C) is usually 0.0001 to 100 mol/L, preferably 0.01 to 10 mol/L in terms of Al atom. The concentration of the component (B) is usually 0.0001 to 1000 mmol/L and preferably 0.01 to 50 mmol/L in terms of the transition metal atom.

The polymerization process is not specifically limited, and includes a solvent polymerization using an aliphatic hydrocarbon such as butane, pentane, hexane, heptane, octane or the like; an aromatic hydrocarbon such as benzene, toluene or the like; or a halogenated hydrocarbon such as methylene dichloride or the like, as a solvent, or a slurry polymerization, a bulk polymerization which is carried out in a liquid monomer, a gas phase polymerization in which polymerization is conducted in a gaseous monomer. As the polymerization process, both of a batch-wise polymerization and a continuous polymerization are possible, and further polymerization may be carried out dividing into 2 or more steps of different conditions. In general, the polymerization time is appropriately determined according to the kind of a desired polymer and a reaction apparatus, and 1 minute to 20 hours can be adopted.

The present invention is preferably applied to polymerization in which addition polymerized particles are formed (e.g. slurry polymerization, gas phase polymerization, bulk polymerization).

Slurry polymerization may be conducted according to known slurry polymerization method and polymerization conditions, but is not limited thereto. In preferable slurry polymerization method, a monomer (and comonomer), supplied materials, a diluent and the like are continuously added, if required, and a continuous type polymerization reactor from which produced polymers are continuously or periodically taken out, is used.

As a reactor, a loop reactor, stirring type reactor and a plurality of stirring type reactor in which the reactors are different or reaction conditions are different connected seriesly or parallely or combination thereof, are illustrated.

As a diluent, there can be used an inert diluent (medium) such as a paraffinic, cycloparaffinic or aromatic hydrocarbon.

The temperature of the polymerization reactor or reaction zone is normally within the range from about 0 to about 150° C., and preferably from about 30 to about 100° C. The pressure is normally within the range from about 0.1 to about 10 MPa, and preferably from 0.5 to 5 MPa. There can be set to a pressure at which a catalyst can be maintained in a suspended state and a medium and at least a part of a monomer and a comonomer can be maintained in the sate of a liquid phase and, furthermore, the monomer and comonomer can be brought into contact with each other. Accordingly, the medium, temperature and pressure may be selected so that the olefin polymer is formed as solid particles and is recovered in that form.

The molecular weight of the addition polymer can be controlled by known means such as control of the temperature of the reaction zone, introduction of hydrogen to the polymerization reactor, or the like.

The respective catalyst components and a monomer (and comonomer) can be added to the reactor or reaction zone by a known method in arbitrary order. For example, there can be used a method of adding the respective catalyst components and the monomer (and comonomer) to the reaction zone, simultaneously or successively. If desired, the respective catalyst components can be previously brought into contact with each other in an inert atmosphere before bringing into contact with the monomer (and comonomer).

The gas phase polymerization may be performed according to a known gas phase polymerization method and polymerization conditions, but is not limited thereto. As the gas phase polymerization reactor, there can be used a fluidized bed type reactor, preferably a fluidized bed type reactor having an extended portion. A reactor equipped with a stirring blade in its reactor may also be used with no problem.

In the feeding of the respective components to the polymerization vessel, there can be used a method of feeding them in the absence of water using an inert gas (e.g. nitrogen, argon, etc.), hydrogen, ethylene or the like, or a method of feeding them in the form of a solution or slurry after dilution The respective catalyst components may be separately fed, or fed after previously bringing the arbitrary components in contact with each other in an arbitrary order.

Regarding the polymerization conditions, the temperature is lower than the temperature at which the polymer is molten, preferably from about 0 to about 150° C., and particularly preferably from 30 to 100° C. Furthermore, hydrogen may also be added as a molecular weight modifier for the purpose of controlling the melt flow of the final product. In case of the polymerization, an inert gas may coexist in a mixed gas.

In the present invention, preliminary polymerization (prepolymerization) may be conducted prior to main polymerization (sometimes referred to simply as polymerization).

As monomers which can be used, any one of olefins diolefins, cyclic olefins and alkenyl aromatic hydrocarbons having up to 20 carbon atoms and polar monomers can be used, and two or more monomers thereof can also be used, simultaneously. Specific examples thereof include olefins such as ethylene, propylene, 1-butene, 1-pentene, 4-methyl-1-pentene-1,5-methyl-1-hexene, 1-hexene, 1-heptene, 1-octene, 1-nonene, 1-decene, and the like, diolefins such as 1,5-hexadiene, 1,4-hexadiene 1,4-pentadiene, 1,7-octadiene, 1,8-nonadiene, 1,9-decadiene, 4-methyl-1,4-hexadiene, 5-methyl-1,4-hexadiene, 7-methyl-1,6-octadiene, 5-ethylidene-2-norbornene, dicyclopentadiene, 5-vinyl-2-norbornene, 5-methyl-2-norbornene, norbornadiene, 5-methylene-2-norbornene, 1,5-cyclooctadiene, 5,8-endomethylenehexahydronaphthalene, 1,3-butadiene, isoprene, 1,3-hexadiene, 1,3-octadiene, 1,3-cyclooctadiene, 1,3-cyclohexadiene and the like; cyclic olefins such as norbornene, 5-methylnorbornene, 5-ethylnorbornene, 5-butylnorbornene, 5-phenylnorbornene, 5-benzylnorbornene, tetracyclododecene, tricyclodecene, tricycloundecene, pentacyclopentadecene, pentacyclohexadecene, 8-methyltetracyclododecene, 8-ethyltetracyclododecene, 5-acetylnorbornene, 5-acetyloxynorbornene, 5-methoxycarbonylnorbornene, 5-ethoxycarbonylnorbornene, 5-methyl-5-methoxycarbonylnorbornene, 5-cyanonorbornene, 8-methoxycarbonyltetracyclododecene, 8-methyl-8-tetracyclododecene, 8-cyanotetracyclododecene and the like; alkenylbenzenes such as styrene, 2-phenylpropylene, 2-phenylbutene, 3-phenylpropylene and the like; alkylstyrenes such as p-methylstyrene, m-methylstyrene, o-methylstyrene, p-ethylstyrene, m-ethylstyrene, o-ethylstyrene, 2,4-dimethylstyrene, 2,5-dimethylstyrene, 3,4-dimethylstyrene, 3,5-dimethylstyrene, 3-methyl-5-ethylstyrene, p-tert-butylstyrene, p-sec-butylstyrene and the like; bis(alkenyl)benzenes such as divinylbenzene and the like; alkenyl aromatic hydrocarbons such as alkenylnaphthalenes and the like such as 1-vinylnaphthalene and the like; polar monomers such as α,β-unsaturated carboxylic acids such as acrylic acid, methacrylic acid, fumaric acid, maleic anhydride, itaconic acid, itaconic anhydride, bicyclo(2,2,1)-5-heptene-2,3-dicarboxylic acid and the like, and metal salts thereof such as sodium, potassium, lithium, zinc, magnesium, calcium and the like; α,β-unsaturated carboxylic acid esters such as methyl acrylate, ethyl acrylate, n-propyl acrylate, isopropyl acrylate, tert-butyl acrylate, 2-ethylhexyl acrylate, methyl methacrylate, ethyl methacrylate, n-propyl methacrylate, isopropyl methacrylate, n-butyl methacrylate, isobutyl methacrylate and the like; unsaturated dicarboxylic acids such as maleic acid, itaconic acid and the like; vinyl esters such as vinyl acetate, vinyl propionate, vinyl capronate, vinyl caprate, vinyl laurate, vinyl stearate, vinyl trifluoroacetate and the like; unsaturated carboxylic acid glycidylate such as acrylic acid glycidylate, methacrylic acid glycidylate, itaconic acid monoglycidylate and the like; etc.

The present invention can be applied to homopolymerization or copolymerzation of these monomers. Specific examples of the monomer constituting the copolymer include ethylene and propylene, ethylene and 1-butene, ethylene and 1-hexene, propylene and 1-butene, and the like, but the present invention should not be limited thereto.

The homogeneous type-solid catalyst component and homogeneous type solid catalyst are particularly suitable for a catalyst component or catalyst for polymerization of olefins, and are suitably used for the production of olefin polymers. As the olefin polymers, copolymers of ethylene and an α-olefin having 3 to 20 carbon atoms are preferable. Among these, copolymers of ethylene and the α-olefin having a polyethylene crystal structure are particularly preferable. Herein, preferable α-olefin is an α-olefin having 3 to 8 carbon atoms such as 1-butene, 1-hexene, 1-octene and the like.

EXAMPLES

The invention will now be described in more detail based on Examples and Comparative Examples, which should not be construed as a limitation upon the invention.

Respective values found in Examples are measured according to the following methods:

(1) Content of a repeating unit derived from α-olefin in a copolymer is calculated by a calibration curve based on specific absorptions of ethylene and α-olefin measured with infrared spectrophotometer (FT-IR 7300, manufactured by JASCO Corporation) and represented as a short-chain branching (SCB) per 1,000 carbon atoms.

(2) Elementary Analysis:

Zn: A specimen was immersed in an aqueous sulfuric acid solution (1M) and exposed to ultrasonic wave to extract metal components. The obtained liquid portion was assayed for quantification by ICP emission spectroscopy.

F: A combustion gas formed by combusting a sample in a flask filled with oxygen gas was absorbed in an aqueous sodium hydroxide solution (10%) and the obtained solution was assayed for quantification by ion electrode method.

(3) Measurement of Particle Size Distribution of Polymer:

Particle size distributions of polymers were measured by vibrating sieve. Volume-based geometric standard deviation ($\sigma_{15.87\%}$ and $\sigma_{84.13\%}$) of particle size was calculated from the results of measurement according to the following equations:

$$\sigma_{15.87\%} = D_{50\%}/D_{15.87\%}$$

$$\sigma_{84.13\%} = D_{50\%}/D_{84.13\%}$$

In the above equations, $D_{50\%}$ represents a particle size of a polymer at a cumulative volume fraction of 50%, $D_{15.87\%}$ represents a particle size of a polymer at a cumulative volume fraction of 15.87% and $D_{84.13\%}$ represents a particle size of a polymer at a cumulative volume fraction of 84.13%. A greater geometric standard deviation ($\sigma$) indicates a broad distribution and a smaller deviation indicates a narrow distribution. Specifically, a greater $\sigma_{15.87\%}$ indicates that a relative amount of fine powder in the polymer is great and a greater $\sigma_{84.13\%}$ indicates that a relative amount of bulk is great.

Example 1

(1) Synthesis of Solid Product:

Into a 5-liter four-necked flask in which the atmosphere was replaced with nitrogen were charged 1.5 liter of tetrahydrofuran and 1.36 liter (2.75 mol) a solution of diethylzinc in hexane (2.03 mol/liter), and then the solution was cooled to 5° C. A solution of 203.3 g (1.10 mol) of pentafluorophenol dissolved in 300 ml of tetrahydrofuran was added dropwise thereto over 1 hour. After the addition completed, the temperature was kept for 1 hour and raised to 45° C. and the solution was stirred for 1 hour. Then, the temperature was lowered to 20° C. in a water bath and 45.16 g (2.51 mol) of $H_2O$ was added dropwise over 1.5 hour. As the result, a yellow slurry was obtained. After stirring at 20° C. for 1 hour, the temperature was raised to 45° C. and stirring was continued for 1 hour. The solution was allowed to stand overnight. Volatile components were removed by distillation and the residue was dried under vacuum at 120° C. for 8 hours. As the result, 430 g of a yellow solid product was obtained.

(2) Synthesis of a Homogeneous Type Solid Catalyst Component:

Into a 50-ml four-necked flask in which the atmosphere was replaced with nitrogen were charged 4.03 g of the solid product synthesized in the above Example 1 (1) and 30 ml of tetrahydrofuran, and the mixture was stirred. 3.06 g of silica (Sylopol 948, manufactured by Davison Ltd.; average particle diameter: 59 μm, pore volume: 1.61 ml/g, specific surface area: 306 m²/g) heat-treated at 300° C. under nitrogen stream, was added thereto. After heating to 40° C. and stirring for 2 hour, the mixture was allowed to stand for precipitating solid components. The upper layer of slurry portion was removed at a point in time at which an interface between a layer of precipitated solid component and an upper layer of slurry-form portion becomes visible and then the residual solution was removed with filter. As a washing treatment, 30 ml of tetrahydrofuran was added thereto, followed by heating to 40° C. with stirring, standing to precipitate solid components and removing the upper slurry portion at which an interface between a layer of precipitated solid component and an upper layer of slurry-form portion becomes visible and then the residual solution was removed with filter. The above washing treatment was repeated 5 times in total. Further, 30 ml of tetrahydrofuran was added and the mixture was stirred. Then stirring was discontinued and simultaneously the mixture was filtered with a filter. The time period needed for filtration was 17 seconds. Then, by drying under vacuum at 120° C. for 8 hours, 4.43 g of modified particles was obtained. Elementary analysis showed that Zn=2.8 mmol/g and F=3.5 mmol/g.

(3) Polymerization:

An autoclave equipped with a stirrer having an inside volume of 3 liter, which was dried in vacuums and in which the atmosphere was replaced by argon, was evacuated and charged with 55 g of 1-butene and 695 g of butane. The temperature was raised to 70° C. Ethylene was added so that its partial pressure was 1.6 MPa and the system was stabilized. To this mixture was charged 0.9 ml of a solution of triisobutylaluminum in hexane adjusted to a concentration of 1 mmol/ml. Then, 0.25 ml of a solution of racemic ethylenebis(1-indenyl)zirconium dichloride in toluene adjusted to a concentration of 2 μmol/ml and subsequently 8.7 mg of the modified particles obtained in the above (2) as a homogeneous type solid catalyst component were charged. The polymerization was carried out at 70° C. for 1 hour while feeding ethylene in such manner that the total pressure was constant. As the result, 96.5 g of an olefin polymer having good particle properties was obtained. The polymerization activity per the homogeneous type solid catalyst component (obtained in the above Example 1 (2)) was 11,100 g/g homogeneous type solid catalyst component/hour. The obtained olefin polymer had a SCB of 14.5. The volume-based geometric standard deviations for particle diameter of the polymer were $\sigma_{15.87\%}$=1.32 and $\sigma_{84.13\%}$=1.29.

Comparative Example 1

(1) Synthesis of a Component (A):

Into a 50-ml four-necked flask in which the atmosphere was replaced with nitrogen were charged 4.08 g of the solid product synthesized in the above Example 1 (1) and 30 ml of tetrahydrofuran, and the mixture was stirred. 3.04 g of silica (Sylopol 948, manufactured by Davison Ltd.; average particle diameter: 59 μm, pore volume: 1.61 ml/g, specific surface area: 306 m²/g) heat-treated at 300° C. under nitrogen stream, was added thereto. After heating to 40° C. and stirring for 2 hour, the mixture was filtered with a filter. As a washing treatment, 30 ml of tetrahydrofuran was added thereto, followed by heating to 40° C. with stirring and filtering with a filter. The above washing treatment was repeated 5 times in total. The time period needed for one filtration was 41 seconds in average. Then, by drying under vacuum at 120° C. for 8 hours, 4.39 g of modified particles was obtained. Elementary analysis showed that Zn=2.8 mmol/g and F=3.5 mmol/g.

(2) Polymerization:

An autoclave equipped with a stirrer having an inside volume of 3 liter, which was dried in vacuum, and in which the atmosphere was replaced by argon, was evacuated and charged with 55 g of 1-butene and 695 g of butane. The temperature was raised to 70° C. Ethylene was added so that its partial pressure was 1.6 MPa and the system was stabilized. To this mixture was charged 0.9 ml of a solution of triisobutylaluminum in hexane adjusted to a concentration of 1 mmol/ml. Then, 0.25 ml of a solution of racemic ethylenebis(1-indenyl)zirconium dichloride in toluene adjusted to a concentration of 2 μmol/ml and subsequently 7.9 mg of the modified particles obtained in the above (1) as a homogeneous type solid catalyst component were charged. The polymerization was carried out at 70° C. for 1 hour while feeding ethylene in such manner that the total pressure was constant. As the result, 121 g of an olefin polymer was obtained. The polymerization activity per the homogeneous type solid catalyst component (obtained in the above Comparative Example 1 (1)) was 15,300 g/g homogeneous type solid catalyst component/hour. The obtained olefin polymer had a SCB of 13.0. The volume-based geometric standard deviations for particle diameter of the polymer were $\sigma_{15.87\%}=1.87$ and $\sigma_{84.13\%}=1.42$.

Example 2

(1) Synthesis of a Component (A):

Into a 200-ml four-necked flask in which the atmosphere was replaced with nitrogen was charged, 9.93 g of silica (Sylopol 945, manufactured by Davison Ltd.; average particle diameter: 58 μm, pore volume: 1.65 ml/g, specific surface area: 298 m$^2$/g) heat-treated at 300° C. under nitrogen stream. After adding 100 ml of toluene, the mixture was cooled to 5° C. with ice bath. To this mixture was added dropwise 24.0 ml of a solution of PMAO-s in toluene (3.15 mol/liter; manufactured by Tosoh-Finechem Ltd.) over 55 minutes. After stirring at 5° C. for 30 minutes, the mixture was heated to 95° C. over 90 minutes and stirred for 4 hours. After cooling to 60° C., the mixture was allowed to stand for precipitating solid components. The upper layer of slurry portion was removed at a point in time at which an interface between a layer of precipitated solid component and an upper layer of slurry-form portion becomes visible. As a washing treatment, 60 ml of toluene was added thereto, followed by stirring for 5 minutes, discontinuing the stirring, standing to precipitate solid components and removing similarly the upper layer of slurry portion at which a interface between a layer of precipitated solid component and an upper layer of layer of slurry-form portion becomes visible. The above washing treatment was repeated 3 times in total. Further, 100 ml of toluene was added and the mixture was stirred. Then stirring was discontinued and simultaneously the mixture was filtered with a filter. This treatment was repeated additional 2 times. The time period needed for filtration was 25.8 seconds in average. Further, 100 ml of hexane was added and the mixture was stirred. Then stirring was discontinued and simultaneously the mixture was filtered with a filter. This treatment was repeated additional 2 times. Then, by drying under vacuum at 50° C., 12.6 g of modified particles was obtained. Elementary analysis showed that Al=4.4 mmol/g.

(2) Polymerization:

An autoclave equipped with a stirrer having an inside volume of 3 liter, which was dried in vacuum, and in which the atmosphere was replaced by argon, was evacuated and charged with 55 g of 1-butene and 695 g of butane. The temperature was raised to 70° C. Ethylene was added so that its partial pressure was 1.6 MPa and the system was stabilized. To this mixture was charged 0.9 ml of a solution of triisobutylaluminum in hexane adjusted to a concentration of 1 mmol/ml, Then, 0.75 ml of a solution of racemic ethylenebis(1-indenyl)zirconium dichloride in toluene adjusted to a concentration of 2 μmol/ml and subsequently 8.9 mg of the modified particles obtained in the above (1) as a homogeneous type solid catalyst component were charged. The polymerization was carried out at 70° C. for 1 hour while feeding ethylene in such manner that the total pressure was constant. As the result, 137 g of an olefin polymer having good particle properties was obtained. The polymerization activity per the homogeneous type solid catalyst component (obtained in the above Example 2 (1)) was 15,400 g/g homogeneous type solid catalyst component/hour. The obtained olefin polymer had a SCB of 15.3. The volume-based geometric standard deviations for particle diameter of the polymer were $\sigma_{15.87\%}=1.25$ and $\sigma_{84.13\%}=1.29$.

Comparative Example 2

(1) Synthesis of a Component (A):

Into a 200-ml four-necked flask in which the atmosphere was replaced with nitrogen was charged, 9.91 g of silica (Sylopol 948, manufactured by Davison Ltd.; average particle diameter: 58 μm, pore volume: 1.65 ml/g, specific surface area: 298 m$^2$/g) heat-treated at 300° C. under nitrogen stream. After adding 99.1 ml of toluene, the mixture was cooled to 5° C. with ice bath. To this mixture was added dropwise 23.9 ml of a solution of PMAO-s in toluene (3.15 mol/liter; manufactured by Tosoh-Finechem Ltd.) over 55 minutes. After stirring at 5° C. for 30 minutes, the mixture was heated to 95° C. over 90 minutes and stirred for 4 hours. After cooling to 60° C., the stirring was discontinued and simultaneously the mixture was filtered. As a washing treatment, 99.1 ml of toluene was added thereto, followed by stirring, discontinuing the stirring, and simultaneously filtering with a filter. The above washing treatment was repeated 3 times in total. The time period needed for filtration was 64 seconds in average. Further, 99.1 ml of hexane was added and the mixture was stirred. Then stirring was discontinued and simultaneously the mixture was filtered with a filter. This treatment was repeated additional 2 times. Then, by drying under vacuum at 50° C., 13.3 g of modified particles was obtained. Elementary analysis showed that Al=4.4 mmol/g.

(2) Polymerization:

An autoclave equipped with a stirrer having an inside volume of 3 liter, which was dried in vacuum, and in which the atmosphere was replaced by argon, was evacuated and charged with 55 g of 1-butene and 695 g of butane. The temperature was raised to 70° C. Ethylene was added so that its partial pressure was 1.6 MPa and the system was stabilized. To this mixture was charged 0.9 ml of a solution of triisobutylaluminum in hexane adjusted to a concentration of 1 mmol/ml. Then, 0.75 ml of a solution of racemic ethylenebis(1-indenyl)zirconium dichloride in toluene adjusted to a concentration of 2 μmol/ml and subsequently 8.8 mg of the modified particles obtained in the above (1) as a homogeneous type solid catalyst component were charged. The polymerization was carried out at 70° C. for 1 hour while feeding ethylene in such manner that the total pressure was constant. As the result, 112 g of an olefin polymer was obtained. The polymerization activity per the homogeneous type solid catalyst component (obtained in the above Comparative Example 2 (1)) was 12,700 g/g homogeneous type solid catalyst component/hour. The obtained olefin polymer had a SCB of 13.9. The volume-based geometric standard deviations for particle diameter of the polymer were $\sigma_{15.87\%}=1.31$ and $\sigma_{84.13\%}=1.53$.

As described above in detail, according to the present invention, a homogeneous type solid catalyst component or a homogeneous type solid catalyst which can give an addition polymer excellent in shape and particle properties when applied as a single site catalyst to a polymerization accompanied by the formation of addition polymer particles (for example, slurry polymerization, vapor phase polymerization, bulk polymerization and the like) and a process for production thereof, as well as a process for producing an addition polymer in which a single site catalyst is applied to a polymerization accompanied by the formation of addition polymer particles (for example, slurry polymerization, vapor phase polymerization, bulk polymerization and the like) to produce an addition polymer excellent in shape and particle properties are provided.

In addition, when the invention contains a step for filtering with a filter or the like after carrying out a step for removing fine-powdery and/or shapeless component, any loading of the filter is avoided and said filtering step can be effectively performed. Therefore, according to the present invention, an effective process for producing a homogeneous type solid catalyst component or a homogeneous type solid catalyst is also provided. Consequently, the present invention has a great industrial utility.

The invention claimed is:

1. A process for producing a solid catalyst component for a transition metal complex or a solid catalyst containing a transition metal complex comprising, in a washing step in the production of a solid catalyst component for a transition metal complex or a solid catalyst containing a transition metal complex, a step for removing a slurry-form portion at a point in time at which an interface between a layer of precipitated solid component and an upper layer of a layer of slurry-form portion becomes visible.

2. The process according to claim 1, wherein the solid catalyst component for a transition metal complex or the solid catalyst containing a transition metal complex is a modified particle obtained by contacting the following (a), the following (b), the following (c) and a particle (d):

(a) a compound represented by the following general formula [1]:

$$M^1L^1{}_m \qquad [1]$$

(b) a compound represented by the following general formula [2]:

$$R^1{}_{t-1}TH \qquad [2]$$

(c) a compound represented by the following general formula [3]:

$$R^2{}_{t-2}TH_2 \qquad [3]$$

wherein in the above formulae [1] to [3], $M^1$ represents a metal atom in the groups I, II, XII, XIV or XV in The Periodic Table, and m represents a valence of $M^1$; $L^1$ represents a hydrogen atom, a halogen atom or a hydrocarbon group, and in the case where plural $L^1$s exist, they may be the same or different; $R^1$ represents an electron attractive group or a group containing an electron attractive group, and in the case where plural $R^1$s exist, they may be the same or different; $R^2$ represents a hydrocarbon group or a halogenated hydrocarbon group; T represents, independent of each other, an atom in the groups XV or XVI in The Periodic Table, and t represents a valence of T.

3. The process according to claim 1, wherein the solid catalyst component for a transition metal complex or the solid catalyst containing a transition metal complex is a modified particle obtained by contacting an aluminoxane (f) and a particle (d).

4. The process according to claim 1, wherein the solid catalyst component for a transition metal complex or the solid catalyst containing a transition metal complex is a modified particle obtained by contacting an aluminoxane (f) a particle (d) and a transition metal component (g).

5. A solid catalyst component for a transition metal complex or a solid catalyst containing a transition metal complex obtained by the process according to claim 1.

6. A process for producing an addition polymer which comprises polymerizing an addition polymerizable monomer using the solid catalyst component for a transition metal complex or the solid catalyst containing a transition metal complex according to claim 5.

* * * * *